United States Patent
Weissman

(10) Patent No.: US 10,656,263 B2
(45) Date of Patent: May 19, 2020

(54) EXTENDED LOCALIZATION RANGE AND ASSETS TRACKING

(71) Applicant: QUALCOMM Incorporated, San Diego, CA (US)

(72) Inventor: Haim Mendel Weissman, Haifa (IL)

(73) Assignee: QUALCOMM Incorporated, San Diego, CA (US)

(*) Notice: Subject to any disclaimer, the term of this patent is extended or adjusted under 35 U.S.C. 154(b) by 242 days.

(21) Appl. No.: 15/704,883

(22) Filed: Sep. 14, 2017

(65) Prior Publication Data

US 2019/0079176 A1    Mar. 14, 2019

(51) Int. Cl.
   G01S 13/75    (2006.01)
   G06K 7/10    (2006.01)
   (Continued)

(52) U.S. Cl.
   CPC .............. G01S 13/751 (2013.01); G01S 3/18 (2013.01); G01S 5/0036 (2013.01);
   (Continued)

(58) Field of Classification Search
   CPC ...... G01S 13/758; G01S 13/876; G01S 13/34; G01S 13/751; G01S 13/756; G01S 13/865; G01S 13/878; G01S 13/931; G01S 17/936; G01S 19/42; G01S 2013/9332; G01S 2013/9339; G01S 2013/9342; G01S 2013/9353; G01S 2013/9357; G01S 2013/936; G01S 2013/9375; G01S 3/18;
   (Continued)

(56) References Cited

U.S. PATENT DOCUMENTS 6,249,680 B1    6/2001    Wax et al.
7,456,726 B2    11/2008    Hansen et al.
(Continued)

FOREIGN PATENT DOCUMENTS

DE    102014213171 A1    10/2015
DE    102014217847 A1    3/2016
(Continued)

OTHER PUBLICATIONS

International Search Report and Written Opinion—PCT/US2018/048239—ISA/EPO—dated Nov. 23, 2018.

*Primary Examiner* — Yong Hang Jiang
(74) *Attorney, Agent, or Firm* — Hunter Clark PLLC

(57) ABSTRACT

A method includes: transmitting, from a reader device, a first set of wireless signals, in a first frequency band, detectable by RFID transponder devices; transmitting, from the reader device, a second set of wireless signals, at a second frequency band different from the first frequency band, detectable by the RFID transponder devices; detecting, at the reader device, a set of reply wireless signals transmitted by one or more of the RFID transponder devices in response to the first set of wireless signals, the set of reply signals comprising identification data associated with the one or more of the RFID transponder devices, and orientation information representative of relative orientation of the respective one or more of the RFID transponder devices to the reader device; and deriving location information for at least one of the one or more of the RFID transponder devices based on the detected set of reply wireless signals.

30 Claims, 15 Drawing Sheets

(51) Int. Cl.
*H04B 17/318* (2015.01)
*H04B 5/00* (2006.01)
*G01S 5/02* (2010.01)
*G01S 5/08* (2006.01)
*G01S 3/18* (2006.01)
*G01S 13/87* (2006.01)
*G01S 5/00* (2006.01)

(52) U.S. Cl.
CPC ......... *G01S 5/0252* (2013.01); *G01S 5/0284* (2013.01); *G01S 5/08* (2013.01); *G01S 13/758* (2013.01); *G01S 13/876* (2013.01); *G01S 13/878* (2013.01); *G06K 7/10366* (2013.01); *H04B 5/0062* (2013.01); *H04B 17/318* (2015.01)

(58) Field of Classification Search
CPC .... G01S 5/0036; G01S 5/0252; G01S 5/0284; G01S 5/08; G01S 7/412; G01S 7/4802; G01C 21/28; G01C 21/3658
USPC .................................. 340/10.1, 10.4, 10.41
See application file for complete search history.

(56) References Cited

U.S. PATENT DOCUMENTS

| | | | |
|---|---|---|---|
| 7,610,146 | B2 | 10/2009 | Breed |
| 7,693,654 | B1 | 4/2010 | Dietsch et al. |
| 7,979,172 | B2 | 7/2011 | Breed |
| 8,063,769 | B2 | 11/2011 | Rofougaran et al. |
| 8,175,796 | B1 | 5/2012 | Blackburn et al. |
| 8,199,017 | B2 | 6/2012 | Rofougaran |
| 8,712,334 | B2 | 4/2014 | Tuttle |
| 9,195,862 | B2 | 11/2015 | Horst et al. |
| 9,467,118 | B2* | 10/2016 | Zhou ..................... H03H 7/18 |
| 9,989,622 | B1* | 6/2018 | Griesdorf ............... G01S 5/02 |
| 2005/0203681 | A1 | 9/2005 | Minor, Jr. |
| 2007/0013517 | A1 | 1/2007 | Posamentier et al. |
| 2007/0152804 | A1 | 7/2007 | Breed et al. |
| 2008/0303673 | A1* | 12/2008 | Oung .................... H01Q 1/2216 340/572.7 |
| 2010/0311436 | A1* | 12/2010 | Bevan ................. G01S 5/0252 455/456.1 |
| 2010/0328073 | A1* | 12/2010 | Nikitin ................. G01S 5/0247 340/572.1 |
| 2013/0201003 | A1* | 8/2013 | Sabesan ................... G01S 7/42 340/10.1 |
| 2013/0257595 | A1* | 10/2013 | Trosken .............. G01S 5/0247 340/10.1 |
| 2015/0303581 | A1 | 10/2015 | Bodo et al. |
| 2016/0007315 | A1* | 1/2016 | Lundgreen ............. G01S 3/46 455/67.11 |
| 2017/0109552 | A1 | 4/2017 | Berge et al. |
| 2017/0243032 | A1 | 8/2017 | Pesavento et al. |
| 2018/0052222 | A1 | 2/2018 | Zeisler |
| 2019/0080612 | A1 | 3/2019 | Weissman et al. |

FOREIGN PATENT DOCUMENTS

| | | |
|---|---|---|
| EP | 2793041 A1 | 10/2014 |
| EP | 2977788 A1 | 1/2016 |
| WO | 2016164029 A1 | 10/2016 |
| WO | 2016177727 A1 | 11/2016 |

* cited by examiner

EXTENDED LOCALIZATION RANGE AND ASSETS TRACKING

BACKGROUND

Passive RFID (radio frequency identification) devices, based on UHF (ultra-high frequency; 300 MHz-3 GHz) wireless signaling, allow detection and identification of objects in the range of a few meters, and generally have a long shelf life (because these devices do not need to be powered by batteries). UHF systems, however, may not provide accurate localization of objects simply, with location accuracy being on the order of the UHF wavelength (e.g., about 33 cm).

SUMMARY

An example device includes: a transceiver configured to: transmit a first set of wireless signals, in a first frequency band, detectable by RFID (radio frequency identification) transponder devices, and detect a set of reply wireless signals from one or more of the RFID transponder devices responsive to the first set of wireless signals, the set of reply wireless signals comprising identification data that are associated with the one or more of the RFID transponder devices, and orientation information that is representative of relative orientation of the respective one or more of the RFID transponder devices to the device; a transmitter configured to: transmit a second set of wireless signals, at a second frequency band different from the first frequency band, detectable by the RFID transponder devices; and a controller communicatively coupled to the transceiver and the transmitter and configured to derive location information for at least one of the one or more of the RFID transponder devices based on the identification data and the orientation information.

An example of an RFID (radio frequency identification) transponder device includes: a transceiver configured to: receive a first wireless signal in a first frequency band transmitted by a remote device, and transmit a reply wireless signal comprising at least identifier data associated with the RFID transponder device; a receiver configured to receive from the remote device one or more second wireless signals in a second frequency band different from the first frequency band; and a controller communicatively coupled to the transceiver and the receiver and configured to determine orientation information, representative of a relative orientation of the RFID transponder device to the remote device, based on the one or more second wireless signals; where the reply wireless signal further comprises the determined orientation information.

An example method includes: transmitting, from a reader device, a first set of wireless signals, in a first frequency band, detectable by RFID (radio frequency identification) transponder devices; transmitting, from the reader device, a second set of wireless signals, at a second frequency band different from the first frequency band, detectable by the RFID transponder devices; detecting, at the reader device, a set of reply wireless signals transmitted by one or more of the RFID transponder devices in response to the first set of wireless signals, the set of reply wireless signals comprising identification data associated with the one or more of the RFID transponder devices, and orientation information representative of relative orientation of the respective one or more of the RFID transponder devices to the reader device; and deriving location information for at least one of the one or more of the RFID transponder devices based on the detected set of reply wireless signals.

Another example method includes: receiving, at an RFID (radio frequency identification) transponder device, a first wireless signal in a first frequency band transmitted by a remote device; receiving, at the RFID transponder device from the remote device, one or more second wireless signals in a second frequency band different from the first frequency band; determining orientation information, representative of a relative orientation of the RFID transponder device to the remote device based on the one or more second wireless signals; and transmitting, from the RFID transponder device, a reply wireless signal comprising at least identifier data associated with the RFID transponder device and the determined orientation information.

BRIEF DESCRIPTION OF THE DRAWINGS

Like reference symbols in the various drawings indicate like elements, in accordance with certain example implementations.

DETAILED DESCRIPTION

Figure 1:
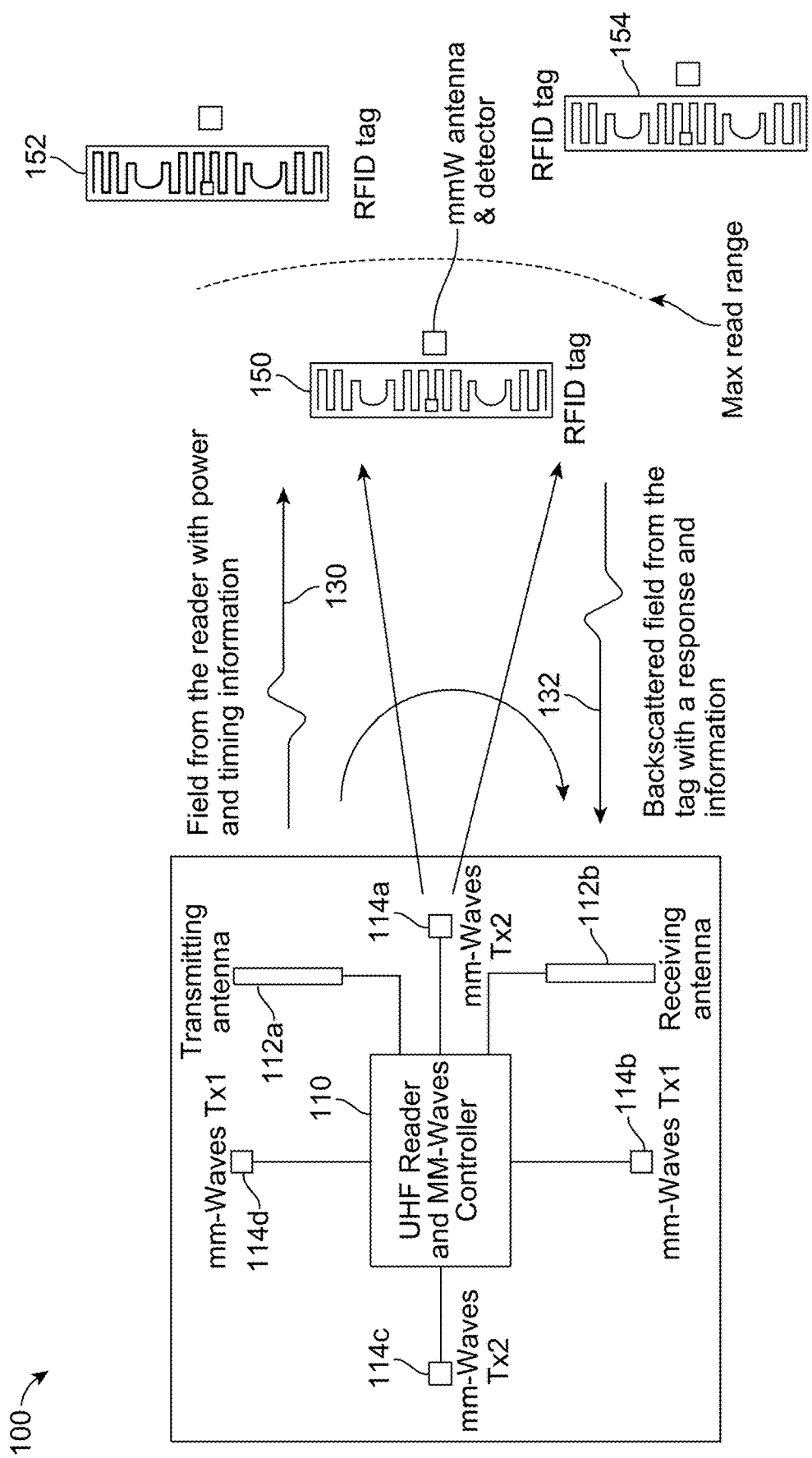
FIG. 1 is a schematic diagram of an example system, including a reader device and one or more transponder devices, for extended localization range for asset tracking.

Described herein are implementations for integrated RFID-MMID (radio-frequency identification—mm-wave identification) systems. For example, such a system may combine object tracking and localization through a combination of UHF wireless signaling and millimeter-wave wireless signals (e.g., RF signals with frequencies higher than 6 GHz) that supports accurate location tracking over several meters. A system may include a UHF reader with two (or more) miniature mm-wave transmitters. The UHF reader maps object identifications (IDs) to UHF RFID transponders. A UHF reader controller scans and steers two (or more) mm-wave transmitters to generate beams over a sphere in interlaced timing mode. The UHF reader can receive the object IDs over a UHF link and can select the beam with a highest received signal strength indication (RSSI) for positioning. The reader can support, in some embodiments, pinpoint localization (e.g., on the order of centimeters, such as 5 cm) based on the RFID-MMID selected mm-wave beams with highest RSSIs.

In some embodiments, at least one RFID-MMID transponder device may receive and respond to RF signals transmitted by the reader device. The at least one transponder device includes a mm-wave RSSI detection circuit added to the regular UHF transponder. The mm-wave detection circuit is configured to measure each steered beam (transmitted by the mm-wave transmitters controlled by the reader device) for signal strength and a UHF transponder controller prepares an RSS (receive signal strength) table accordingly and sends the RSS table to the reader on the UHF link. The mm-wave signal strength (e.g., RSSI) detection circuit is powered by a UHF power harvester (e.g., a wireless power generator to inductively generate electrical current or voltage for powering circuitry). The mm-wave circuitry may be used to determine the transponder's direction (orientation) based on selection of the reader's transmission beam direction that results in highest RSSI. In some embodiments, the transponder device derives a table that lists measured signal strengths (for the received steered millimeter-wave beams) for respective identifiers associated with detected beams. The report of the mm-waves detector measurements to the reader device may be performed through the UHF link from the transponder device back to the reader. In such embodiments, the transponder device sends to the reader device, over the UHF link, the transponder ID, the selected mm-wave beams (e.g., selected based on measured signal strength of the received beams), and the signal strength values of the received beams. In some embodiments, the mm-wave beam (as identified by a respective identifier value, such as a serial number) with the highest signal strength may be used to determine the distance from the reader device to the transponder device. The determined signal strength value (e.g., RSSI) for the selected beam is proportional to the distance to the reader device, and thus may be used to estimate the distance value.

The direction of the device relative to the reader is estimated by the reader controller/processor applying spatial LMS interpolation over the RSS table that was sent by the transponder over the UHF link.

In implementations, approaches, and solutions described herein, a UHF and mm-wave reader are integrated to generate UHF wireless signals (or signals in some other band) that can charge over the air (OTA) passive UHF RFID transponders that comprise mm-wave detectors, to facilitate accurate tracking of inventory and assets. The UHF reader may be configured to: a) map RFID Tags over a few meters range in simple backscattering mode, b) power RFID UHF transponder devices efficiently, with the transponder devices using their respective power harvesters to power the mm-wave detector circuitries and the UHF circuitries realized on the transponder devices, c) control two (or more) mm-wave transmitters to perform beam steering in a time-interlaced mode, and d) read reported-back object IDs (from the transponder devices), together with data representative of an RSS LUT for selected beams detected by the transponder device to provide accurate direction and ranging for the objects. The mm-waves miniature beam steering transmitters (e.g., about 2 cm×2 cm for 64 elements in 60 GHz) included with the reader device generally have high antenna gain and EIRP. The mm-wave detectors (on the transponder devices) may be used for measuring signal strength to select the beam with the highest signal strength (indicated by the RSS) in order to determine the direction to the object (e.g., based on spatial LMS (least mean squared) interpolation) and distance based on peak RSS (derived from link budget).

One or more of the RFID MMID solutions described herein may offer one or more of the following features and advantages. The mm-wave reader section uses a beam steering transmitter (rather than using mm-wave transceivers) configured to perform time interlaced beam steering scanning. Additionally, instead of using an MMID transponder to transmit mm-wave signals with signal strength data (as a function of mm-wave beam IDs), that data are transmitted via lower frequency links (UHF links) that are also used to transmit other data (e.g., identification data). The mm-wave transmitters of the reader device implement a unique beam steering process to allow accurate recording of signal strength values (at the transponder devices) for identifiable beams. A unique triangulation process may be implemented based on reported RSS LUTs (look up tables) as a function of the beam steering positions, using spatial LMS interpolation performed by, for example, the reader (comprising the UHF and mm-wave transmitters).

A reader device may include a first communication module (e.g., a transceiver including a transmitter and a receiver) configured to transmit a first set of wireless signals (e.g., UHF signals) in a first frequency band, detectable by RFID transponder devices, and detect a set of reply wireless signals transmitted by one or more of the RFID transponder devices in response to the first set of wireless signals. The reader device may include a second communication module (e.g., a transmitter or a transceiver including a transmitter and a receiver) configured to transmit a second set of wireless signals (e.g., millimeter-wave signals) at a second frequency band different from the first frequency band, detectable by the RFID transponder devices, and a controller configured to derive location information for at least one of the one or more of the RFID transponder devices based on the detected set of reply wireless signals. The set of reply signals, responsive to the first set of wireless signals, comprises identification data associated with the one or more of the RFID transponder devices, and orientation information, derived based at least in part on the transmitted second set of wireless signals detectable at the one or more of the RFID transponder devices, representative of relative orientation of the respective one or more of the RFID transponder devices to the device. The second communication module may be configured to transmit millimeter-wave wireless beams in an interlaced timing mode, with the millimeter-wave wireless beams being associated with respective beam identifiers. The orientation information included in the set of reply wireless signals may include data representative of signal strength values, measured by the one or more of the RFID transponder devices, for the respective wireless beams identified by the respective identifiers. The controller may be configured to derive a distance between the device and the at least one of the one or more RFID transponder devices based on a determination of a maximum signal strength measured by the at least one of the one or more RFID transponder devices for the respective wireless beams.

Determining the direction of a transponder from the reader is challenging since a beam-steered antenna array factor (AF) is relatively flat across the peak referred to as the steered direction phase $Q_d$. The array factor is given by the following equation $$AF = \frac{\sin\left(\frac{kNd(\cos\theta_d - \cos\theta)}{2}\right)}{\sin\left(\frac{kd(\cos\theta_d - \cos\theta)}{2}\right)}$$

where N is the number of antenna elements, and d is the inter-element spacing of the implemented antenna array.

Since the AF of the steering antenna is relatively flat (sin x/x) across the peak (at negative and positive offset from the peak), the controller analyzes the RSS (received signal strength) LUTs (look up tables) at different offsets from the peak in a negative phase direction and in a positive phase direction relative to one or more of the RFID transponder devices. The controller derives/determines the direction from the device to at least one of the one or more RFID transponder devices by applying spatial interpolation on the steering RSS LUTs using LMS criteria for each of the one or more RFID transponder devices for the respective wireless beams.

For the case that only one mm-wave transmitter has line of sight (LOS) with the transponder RFID, the reader device determines the location of the tag T (e.g., the transponder RFID) relative to the reader based on a single RSS LUT. An estimated distance $l_A$ (derived from peak RSS—see FIG. 6) from the reader, an estimated direction $\vec{u}$ from the reader, and the known location of the reader defines the RFID transponder location. The estimated direction $\vec{u}$ may be derived by applying LMS interpolation over the RSS table for finding a likely direction in view of antenna pattern span limitations (due to implementation limits, e.g., maximum number of phased array elements) and steering resolution producing ambiguity in the direction.

An RFID transponder device may be provided that includes a first communication module configured to receive a first wireless signal in a first frequency band transmitted by a remote transmitter, and transmit a reply wireless signal comprising at least identifier data associated with the RFID transponder device. The RFID transponder device may also include a second communication module configured to receive from the remote transmitter one or more second wireless signals in a second frequency band different from the first frequency band, and a controller configured to determine orientation information, representative of a relative direction from the RFID transponder device to the remote transmitter, based on the received one or more second wireless signals. The transmitted reply wireless signal includes the determined orientation information. In some embodiments, the RFID transponder device may further include a power harvester to inductively generate electrical current from the received first wireless signal (e.g., for passive RFID transponder devices). The harvested power may be used to power the first communication module and the second communication module.

The controller of the RFID transponder device may be configured to produce a reduced RSS table by selecting table entries (points) meeting some criterion (e.g., entries for measured signal strength that are within about −1 dB of the peak signal strength). In embodiments in which measurements from multiple mm-wave wireless beams are performed (e.g., to implement 3D triangulation or 3D trilateration procedures), RSS reduction for additional tables may be performed. For example, in addition to reducing a first table (Rx1-RSS table) corresponding to a first transmitter (Tx1) based on, for example, peak RSS values to produce an Rx11-RSS table, the controller may also reduce a second table (Rx2-RSS table) corresponding to a second transmitter (Tx2) by selecting entries meeting some criterion (e.g., entries whose measured signal strength value is within a particular signal threshold, with that threshold being the same or different than the threshold used for the Rx1-RSS table reduction, e.g., a threshold of about −1 dB) to produce an Rx21-RSS table. Each point in the new (reduced) tables, namely the Rx11-RSS table and the Rx2-RSS table, may indicate a respective direction to the transmitter Tx1 or the transmitter Tx2.

The reader is configured to determine transponder location using the reduced RSS tables. The controller is configured to determine the direction $\vec{u}$ with respect to the transmitter Tx1 by applying spatial LMS interpolation on the Rx11-RSS table and the direction $\vec{v}$ with respect to transmitter Tx2 by applying spatial LMS interpolation on the Rx21-RSS table. The controller can use the estimated direction from the transmitter Tx1 towards the transponder device (the Tx1 steering direction) and the estimated direction from the transmitter Tx2 towards the transponder device (the Tx2 steering direction) to perform 3D spatial triangulation to find the location of each transponder in space. The controller can determine whether a Tx1 steering line indicative of the Tx1 steering direction and a Tx2 steering line indicative of the Tx2 steering direction intersect. If these steering lines intersect, then the intersection point is the transponder device location relative to the locations of the transmitter Tx1 and the transmitter Tx2. If the steering lines do not intersect, then the controller determines the point of minimal distance to the Tx1 steering line and the Tx2 steering line and this point is defined as the estimated location of the transponder device.

The spatial LMS interpolation method discussed herein may improve the estimated direction error to the RFID transponder for a given steering resolution by a factor of five. For example, for a steering resolution of 5° where averaging between the positive elevation direction (EL_P) results in −1 dB RSSI threshold (e.g., from the peak RSSI) and the negative elevation direction (EL_N) results in −1 dB RSSI threshold (e.g., from the peak RSSI), the error level for the estimated direction to the RFID transponder will be expected to be about 1° instead of 5°.

Referring to FIG. 1, an example system 100 to implement extended localization range for asset tracking is shown. The system 100 includes a reader device 110 (which in the example of FIG. 1 is a UHF reader with a millimeter (mm)-waves controller) that includes a first communication module, e.g., a UHF-based communication module, or some other low-frequency-based communication module, that includes a communication transceiver coupled to, for example, dedicated antennas 112a and 112b, and that is configured to transmit a first set of wireless signals (namely, wireless signals 130), in a first frequency band (e.g., UHF band, or some low RF (radio frequency) frequency band). The wireless signals 130 are detectable by RFID transponder devices (such as RFID transponders 150, 152, 154 (also called tags)). The first communication module is further configured to detect a set of reply signals transmitted by one or more RFID transponder devices in response to the first set of wireless signals. In the example of FIG. 1, the reader device 110 is shown as receiving signals 132, which correspond to a backscattered field from the RFID tag 150. The tags 152 and 154 are shown as being out of range, and therefore, in this example, the tags 152 and 154 may not be able to detect the first set of signals 130 (and thus may not be able to send reply signals responsive to the first set of wireless signals 130).

The reader device 110 further includes a second communication module (not specifically shown, but which may be implemented as transmitters coupled to one or more antennas) configured to transmit a second set of wireless signals, at a second frequency band different from the first frequency band, detectable by the RFID transponder devices. The transmitter(s) of the second communication module may be part of a transceiver that also includes one or more receivers. In some embodiments, the second communication module may be implemented to beam steer millimeter-wave wireless signals, using a beam-steering mechanism coupled to one or more antennas (such as millimeter-wave antennas 114a, 114b, 114c, 114d), to transmit millimeter-wave wireless signals in an interlaced timing mode. The beam-steering mechanism may include mm-wave transmitters placed in different locations, and controlled by the controller of the reader device 110. For example, in some implementations, the reader device 110 may be configured to control miniature (e.g., 64 elements 2×2 cm) mm-wave phased array transmitters (e.g., simplified 801.11ad 60 GHz transmitters). The number of mm-wave transmitters is chosen based upon the covered area (for example, more mm-wave transmitters may be used for coverage areas exceeding 4 m×4 m).

The mm-wave transmitters may be disposed at different point within or outside a housing of the reader device 110, and may be implemented to perform coarse beam scanning (e.g., 5° increments), and to re-scan directions of identified tags, e.g., with a resolution of 2°, in response to determining more localized regions (within the space/volume scanned by the reader) in which the tags are disposed. In situations where the reader device 110 is a stationary device (e.g., in circumstances where the reader is used to track moving objects), the transmitters may be disposed, for example, along a high altitude surface (e.g., ceiling of a room). The steered mm-wave beams generated by the second communication module of the reader device 110 may be detected by an ultra-low power mm-waves RSSI detector included with RFID transponders (such as the RFID transponders 150, 152, 154). In some embodiments, a receiving RFID transponder, such as the RFID transponder 150, may include an energy harvesting module to inductively generate power from the received first set of wireless signals transmitted by the reader device 110 to power the transceiver configured to detect (the first set of wireless signals (and transmit reply signals thereto), and to power the mm-wave receiver/detector configured to receive and measure (or otherwise process) the second set of wireless signals (e.g., mm-wave). Thus, the power for the mm-wave detector may be provided by the inductive power harvester.

The millimeter-wave wireless beams transmitted by the second communication module of the reader device 110 may each be associated with respective beam identifiers, thus allowing the RFID transponders receiving the millimeter-wave beams to measure, record, and associate signal strength values for those different millimeter-wave beams. Signal strength values, measured by the one or more of the RFID transponders (e.g., the RFID transponder 150), may be included (as orientation information) in the reply signals for the first set of signals (e.g., the backscattered reply signals responsive to first set of wireless signals, which may be UHF signals, or some other low RF frequency transmission). That is, and as discussed in greater detail below, signal strength data, or other data, measured based on the beam-steered millimeter-wave signals detected by a mm-wave receiver/detector of an RFID tag, may be included with the reply signals sent in response to the first set of wireless signals (e.g., in the UHF frequency band, or some other low-frequency band) detected the RFID tag. In this way, data measured from the millimeter wave "piggyback" on signals sent by the RFID transponder device in response to the first set of wireless signals. The mm-wave receiver/detector may, in some embodiments, have a dynamic range of, for example, >20 dB, which may allow detection of the mm-wave signals from 0.5 meters to 5 meters. Low power modules, such as ADC units, allow sampling of the detector's RSS readings as a function of the scanned beam position, and report the measurements (optionally after some additional processing) via the reply signals responsive to the first set of wireless signals (e.g., the UHF signals) to a controller of the reader device 110.

The reader device 110 includes a controller (e.g., a processor-based controller that is included within the device that comprises the first and second communication module) configured to derive location information for at least one RFID transponder device based on the detected set of reply wireless signals.

The set of reply signals, which are responsive to the first set of wireless signals, include at least orientation information derived based, at least in part, on the transmitted second set of wireless signals (e.g., the mm-wave signals) detectable at the one or more of the RFID transponder devices, which are representative of relative orientation of the respective one or more of the RFID transponder devices to the reader device 110. The controller of the reader device 110 may receive the readings measured by the mm-wave receiver/detector, and included in the reply signals responsive to the first set of wireless signals, matched to the identity of the scanned beams to provide localization functionality. For example, localization may be implemented using triangulation based on a received signal strength lookup table (RSS LUT) for each scanned beam of two transmitters, and using spatial LMS interpolation on each RSS LUT to estimate the mm-wave transmitter to RFID transponder direction. In such embodiments, the resultant localization may have an expected accuracy of, for example, about 5.5 cm. In another example, beam direction may be derived based on a selected beam with highest RSS. In such embodiments, spatial LMS interpolation over the RSS LUT may provide the estimated direction with an accuracy of about 1° (assuming a 64-element beam-steering transmitter with phase resolution of 45° and beam-scanning resolution below 5°). A distance estimation can be derived based on peak RSS calibrated with anchor tags, which will result in location accuracy based on the RSS detector (e.g., a target localization accuracy may be about 30 cm). In such embodiments, at a distance of 5 meters, the location accuracy (assuming RSS accuracy of 0.5 dB) is expected to be about 30 cm.

Figure 2:
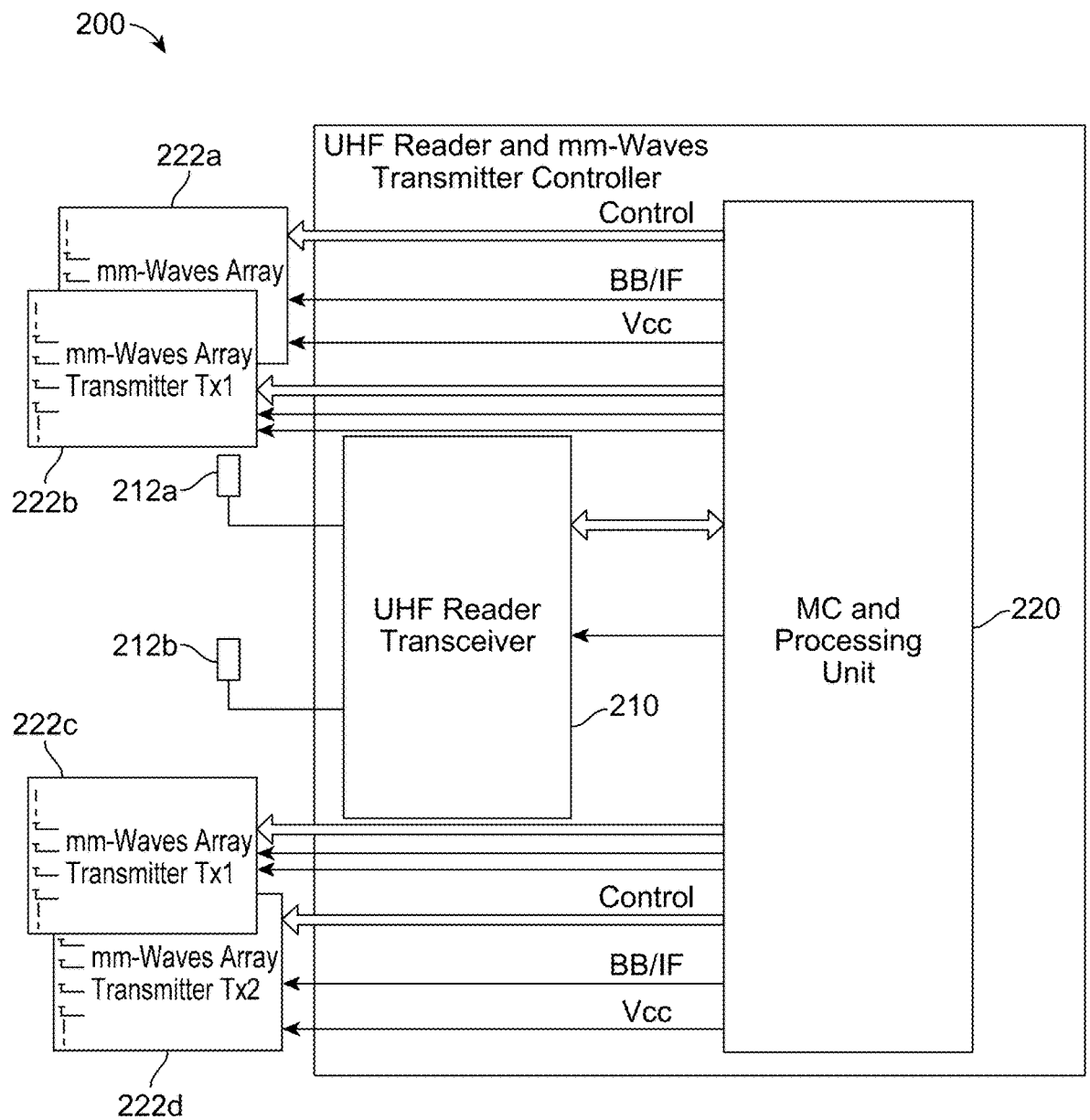
FIG. 2 is a schematic diagram of a reader device.

With reference to FIG. 2, a schematic diagram of a reader device 200, which may be similar (in implementation and/or configuration) to the reader device 110 of FIG. 1, is shown. As with the reader device 110, the reader device 200 includes a first communication module, comprising a transceiver 210 electrically coupled to two antennas 212a and 212b (fewer or additional antennas may be coupled to the transceiver 210). The transceiver 210 is configured to transmit, in conjunction with the antennas 212a-b, a first set of wireless signals in a first frequency band (typically a low frequency RF band, such as UHF, although other bands may also be used). That first set of wireless signals is configured to scan for RFID transponders (e.g., passive or active transponder devices that respond to the first set of wireless signals) by causing the RFID transponder devices receiving the first set of wireless signals to generate reply signals that include at least identification information to identify the responding RFID tag(s).

Figure 3:
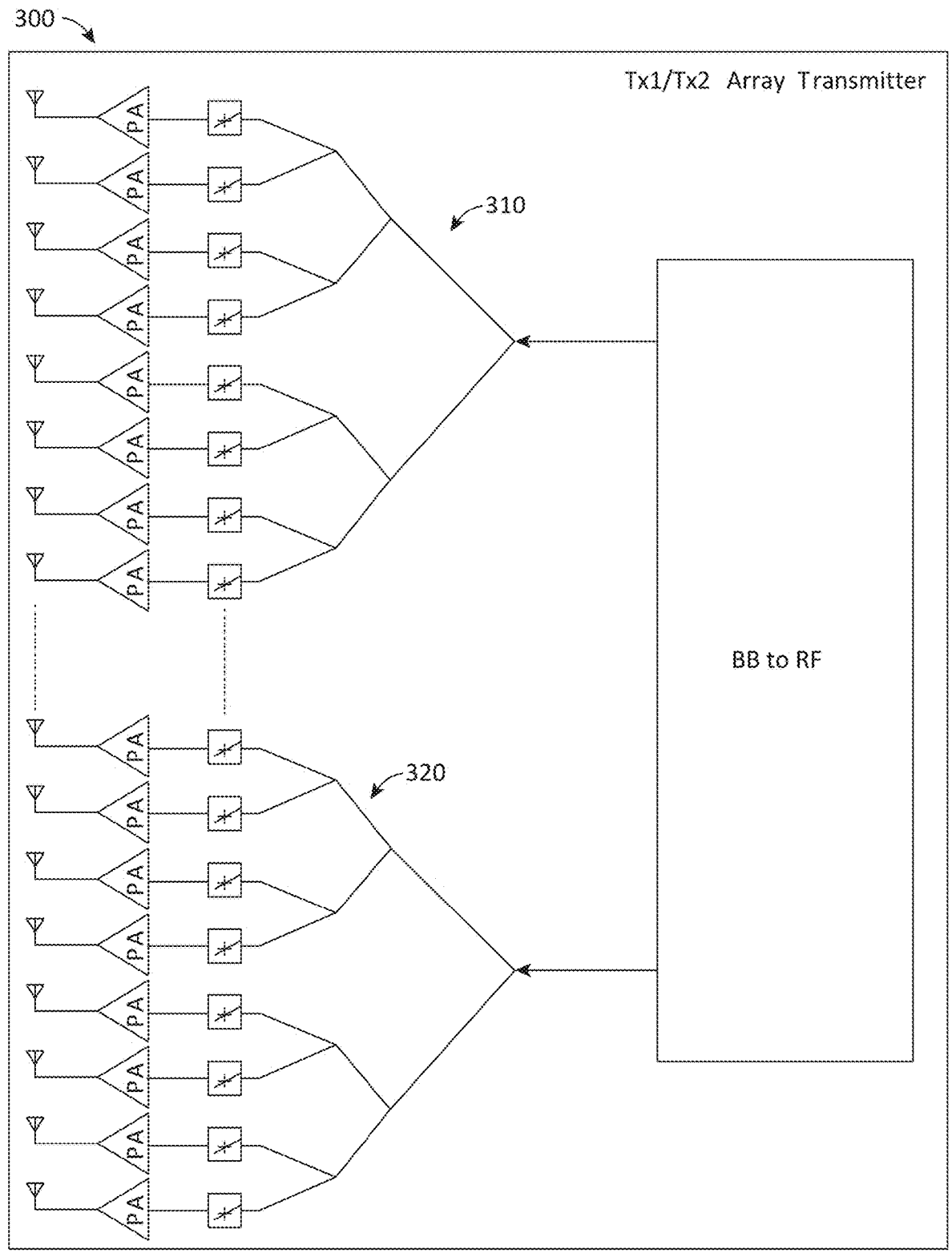
FIG. 3 is a schematic diagram of two mm-wave antenna arrays.

Like the reader device 110 of FIG. 1, the reader device 200 further comprises a second communication module, which includes a millimeter-wave transmitter controller (MC) 220 configured to control two or more mm-wave array transmitters. For example, FIG. 3 is a schematic diagram 300 showing two mm-wave antenna arrays. In some embodiments, and as shown in FIG. 2, the reader 200 may include four (4) mm-wave antenna arrays (and above), each of which may be implemented in a manner similar to the antenna arrays 310 or 320 of FIG. 3. Different numbers, configurations, and implementations of mm-wave antenna arrays may be used to implement a scanning pattern of mm-wave beams.

The MC 220 is implemented, in the example of FIG. 2, as part of a module that also includes a processor/controller to process information (e.g., orientation information included with reply signals received from tags that responded to the first and/or second sets of wireless signals) in order to derive location approximation therefrom. More or fewer array transmitter may be deployed and controlled by the mm-wave transmitter controller 220. The MC 220 may implement a signal steering mechanism (also referred to as beam steering mechanism) to cause a sequence of beamformed millimeter-wave signals to periodically be generated in a predictable manner so that the particular beamformed transmissions can be identified and be used to derive location approximation for remote devices (such as the RFID tags 150, 152, and/or 154 depicted in FIG. 1). The MC 220 may thus actuate and control the mm-wave arrays to, for example, select individual antennas from the arrays 222a-d, control relative phases and amplitudes of signals directed through the various selected antennas, etc., to cause the desired periodical beam-formed pattern of the millimeter-wave that are to be transmitted by the reader device 200.

Figure 4:
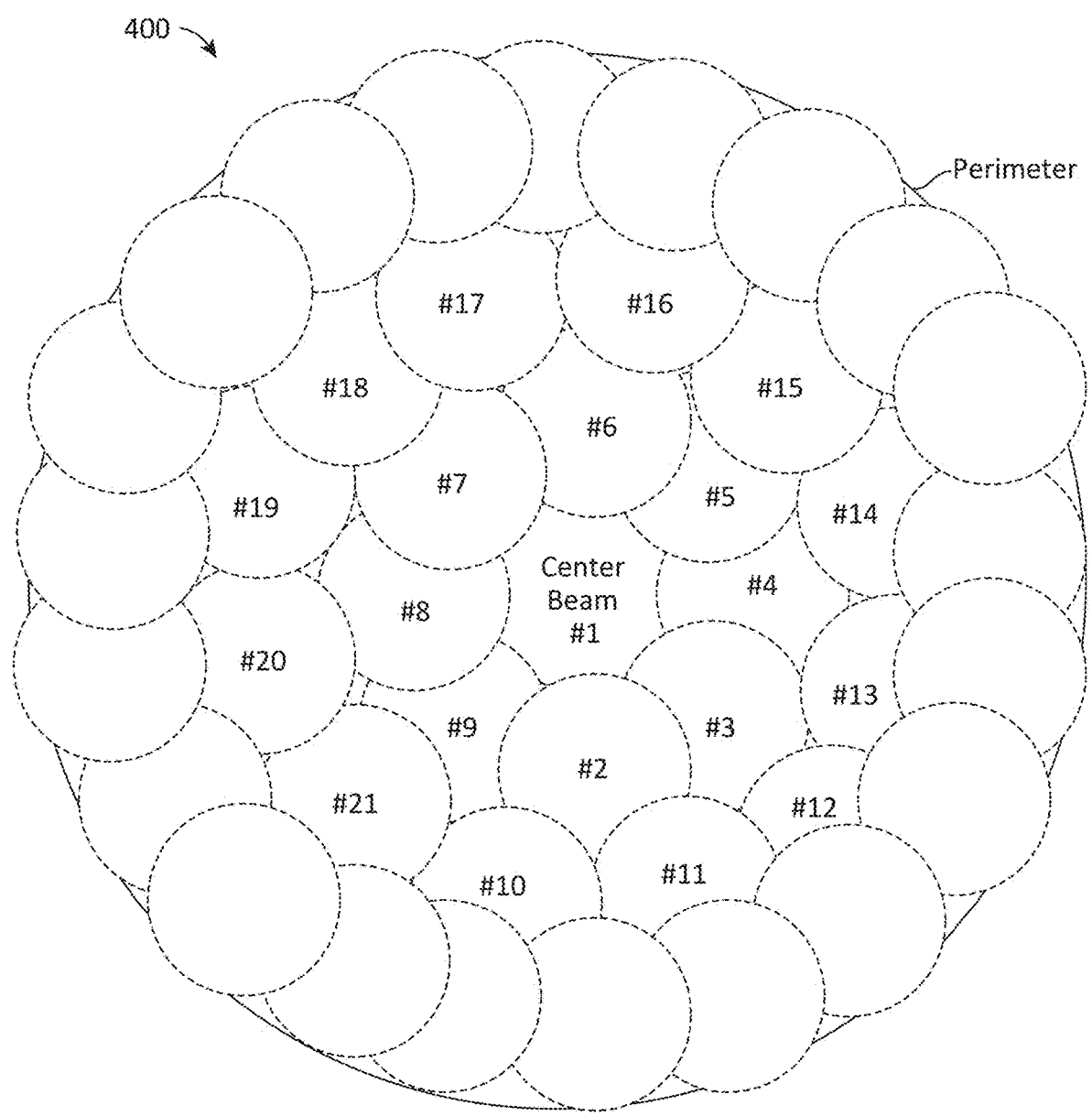
FIG. 4 is a diagram of a beam-steering pattern that may be produced by mm-wave transmitters controlled by the reader device of FIG. 2.

FIG. 4 illustrates a beam-steering pattern 400 that may be produced by the second communication module (e.g., the MC 220 in conjunction with the antenna arrays 222a-d) transmitted by the reader device 200. The beam steering mechanism implemented by the second communication module of the reader 200 (or of the reader 110 of FIG. 1) is configured to perform mm-waves beam scanning in interlaced timing mode (with the transmitters transmitting at separate times). Due to the beam scanning, the beam covers different regions at respective times, here circles (as the beam is conical) starting from a central region (identified in FIG. 4 as "Center beam #1") and extending to outermost boundaries (or perimeter, in the scanning pattern depicted in FIG. 4) of the volume being scanned (or in any other method). Beam steering steps may be generated in fine resolution steps (e.g., 2° steps) to allow accurate localization. In some embodiments, the beam scanning may initially be performed using coarser resolution steps, e.g., of 5°, in order to initially identify tag areas (i.e., identify which portions of the 3-D space being scanned include tags). Once the tag areas, containing the tags whose more accurate positions are to be derived, are identified, the mm-wave scanning resolution can be improved to, for example 2° (or some other appropriate beam-scanning resolution). As also illustrated in FIG. 4, each of the beam-formed signals is associated with an identifier to distinguish the different beams from each other, and thus allow the detection circuits of receiving tags to determine which of the different beams are being detected and to relate the beam with the specific mm-wave transmitter (which allows the relative orientation of the tags, and/or the location of the tags relative to the reader, to be determined). In some embodiments, the identifiers may be encoded in the scanning beam-formed signals, or the signal may otherwise be processed (modulated or adjusted) to represent the respective identities of the beam-formed signals. For example, mm-wave transmitter beam identifiers may be sent over the first communication module (that is configured to transmit a first set of wireless signals (e.g., UHF signals) in a first frequency band) and processed in the RFID transponder microcontroller.

Turning back to FIG. 1, the extended localization system 100 also includes one or more tracked devices whose locations are to be determined, e.g., the RFID transponder devices (tags) 150, 152, and/or 154. These transponder devices include at least a first demodulator/detector to demodulate/detect signals with frequencies in a first frequency band (e.g., UHF signals, or signals in some other low frequency band) and a second detector to detect signals with frequencies in a different (typically higher) band (e.g., millimeter-waves).

Figure 5:
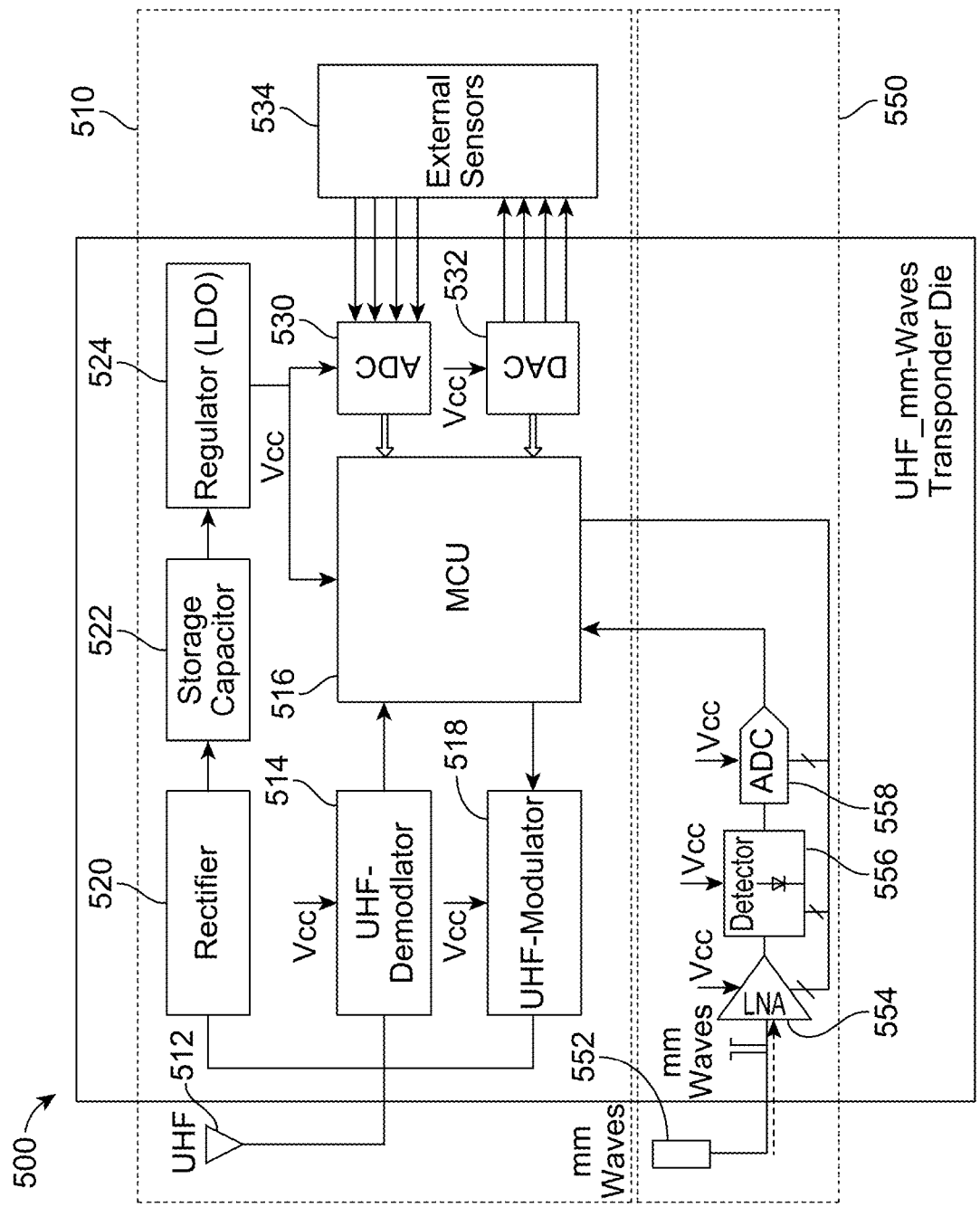
FIG. 5 is a schematic diagram of an example transponder device configured to receive and process signals in two different frequency bands (e.g., UHF band and millimeter-wave band).

Referring to FIG. 5, with further reference to FIG. 1, an example transponder device 500 is configured, for example, to receive and process signals in two different frequency bands (e.g., UHF band and millimeter-wave band), and to transmit data derived based on the millimeter-wave signals via the first band communication link (e.g., UHF link). The transponder device 500 may be implemented as a transponder die that includes a first communication module 510 (here a transceiver including a transmitter and a receiver) configured to receive a first wireless signal in a first frequency band (e.g., UHF, or some other, relatively low, RF band) transmitted by a remote transmitter (e.g., the reader device 110 of FIG. 1), and may further be configured to transmit a reply signal comprising at least identification data (e.g., an identifier) associated with the transponder device 500 (the identifier may be a unique identification number or value that was pre-stored on a non-volatile memory device of the transponder device 500). More particularly, the first communication module 510 includes an antenna element 512, which may be configured or structured to receive and/or transmit signals for a particular RF frequency bands (such as UHF in the illustrated example of FIG. 5), which is coupled to a demodulator 514 (in this case, a UHF demodulator) configured to process received wireless signals to, for example, extract or read data modulated or encoded on the received wireless signals. For example, the demodulator 514, in conjunction with a microcontroller 516 (MCU) (which may be a processor-based microcontroller), may be configured to identify signals transmitted by the reader device 110 in communication with the transponder device 500 to trigger or cause the transponder device 500 to respond with the reply wireless signal. The demodulator 514 may thus include filtering circuits to demodulate the received signal and extract data from the received signals, with that data provided to the MCU 516 for further processing (e.g., to determine if the received signals correspond to signals to which the transponder device 500 is to send a reply signal).

As further illustrated in FIG. 5, the first communication module 510 additionally includes a modulator 518, electrically coupled to the MCU 516 and to the antenna 512, to generate RF signals that are directed to the antenna 512 for transmission. The RF signals generated by the modulator 518 may include the reply signal (e.g., the reply signal 132 depicted in FIG. 1) in response to a determination that the transponder device 500 has received an RF signal (e.g., the RF signal 130) warranting a response. The modulator 518 may thus be configured to generate a signal with particular RF characteristics (e.g., carrier frequency, phase, amplitude, etc.) and to encode or modulate data (identification data, orientation data, and/or location data) onto the reply signal to be transmitted. In the example embodiments described herein, the RF signal to be transmitted (i.e., the reply signal) may be in the same frequency band (e.g., UHF) as that of the signal received via the antenna 512 of the first communication module 510. The RF signal generated by the modulator 518 and directed to the antenna 512 may be sent to the reader device from which the initial UHF signal (and/or other signals in other bands) was received, and/or wirelessly transmitted to other remote devices. The first communication module 510 may also include, in some embodiments, external sensors 534 (e.g., orientation sensors, such as an accelerometer, a gyroscope, a magnetometer, or one or more other types of sensors, including, for example, an optical sensor, a barometer, a thermometer, etc.). The external sensors 534 are coupled to the MCU 516 via an analog-to-digital-converter 530 (ADC) that converts measurement data obtained by the external sensors 534 into digital data that can be processed by the MCU 516, and via a digital-to-analog-converter 532 (DAC) to allow conversion of control signals/data produced by the MCU 516 into signals compatible with the external sensors 534 to allow control and actuation of the external sensors 534.

With continued reference to FIG. 5, the first communication module 510 may also include, in some embodiments, a power harvester to inductively generate electrical power from the received first set of wireless signals. The inductively generated electrical power is used to power the various units of the first communication module 510 (including the demodulator 514, the MCU 516, and the modulator 518), and also to power a low-power second communication module 550 (here a receiver) configured to receive and measure wireless signals from a second frequency band (e.g., millimeter-wave band) that is different from the first frequency band, but without transmitting reply data in that second frequency band. The low-power second communication module is configured to measure received signal strength (RSS) of the wireless signals of the second frequency band (e.g., mm-wave band) to facilitate more accurate localization than can be achieved based on the signals (e.g., UHF signals) detected by the first communication module 510. The power harvester may comprise, in some implementations, a rectifier 520 configured to generate DC power output from inductively generated AC electrical current or voltage, for storage on a storage device 522 (e.g., a battery or capacitor). A regulator 524 (e.g., low-dropout, or LDO, regulator) is used to provide a controlled voltage (marked as Vcc in FIG. 5) or current level to the various load units of the transponder device 500, including the various components of the first communication module 510, the second communication module 550, the external sensors 534, etc.

The transponder device 500 also includes the second communication module 550 that is configured to receive from the remote reader device one or more second wireless signals in a second frequency band (e.g., millimeter-wave band) different from the first frequency band. In the example embodiments of FIG. 5, the second communication module 550 includes an antenna 552 (which may be the same or different antenna used to receive the first set of wireless signals in the first RF band) configured or structured to receive wireless signals in the second wireless band. The antenna 552 may be disposed with the antenna 512 such that the antenna 552 is disposed within an area occupied by the antenna 512 as the antenna 552 will typically be much smaller than the antenna 512. Coupled to the antenna 552 is a low-noise amplifier 554 configured to amplify the wireless signals received at the antenna 552. The amplified signals are directed to a detector 556 configured to measure or compute signal characteristics, such as signal strength (e.g., amplitude, received signal strength (RSS), received signal strength indicator (RSSI), etc.), frequency, phase, etc., for the wireless signals received via the antenna 552. The detector 556 may also be configured to decode or otherwise determine data included with the wireless signals received by the second communication module 550, such as identifiers associated with different beam-formed signals generated by the mm-wave transmitters of the reader device (e.g., the reader device 110 of FIG. 1). The identifiers may, however, be sent via the first communication module 510, configured to transmit a first set of wireless signals (e.g., UHF signals) in a first frequency band, and processed in the MCU 516. The measurements performed by the detector 556 may be converted by an ADC 558 and provided to, for example, the MCU 516 for further processing (e.g., to determine maximum signal strength detected by the second communication module 550 and the particular beam identity associated with that maximum measurement, tabulate measured signal strength and associate the signal strength with the beam identifiers for the signals, perform at least some of the location determination operations to derive a position approximation for the transponder, etc.). As the RFID transponder power is a valuable resource, raw RSS data may be sent to the reader via the first communication module wireless signals (e.g., UHF signals), in a first frequency band from the MCU 516, and processing and calculations relevant for localization (LMS interpolation over the RSS for direction finding, triangulation, etc.) may be performed in the reader controller (e.g., the MC processing unit 220 shown in FIG. 2). In some embodiments, RSS detector power consumption (e.g., implemented by the detector 556, optionally in conjunction with the LNA 554) is less than 50 µW, with the ADC 558 (coupled to the detector 556). In some embodiments, the mm-wave RSS detector may have a dynamic range of about 20 dB. For example, at 5 meters distance the input power at the antenna port (e.g., an MMID 60 GHz antenna port) may be about −40 dBm (assuming 60 GHz antenna gain of 0 dBi and Reader EIRP (effective isotropic radiated power) of +42 dBm). At 50 cm distance, the input power at the antenna port may be about −20 dBm (assuming LOS and 60 GHz antenna gain of 0 dBi and Reader EIRP of +42 dBm). In some embodiments, the mm-wave detector may be triggered by the first communication module 510 (e.g., when the MCU 516 of the first communication module 510 determines that a UHF-triggering signal was received from a combined UHF and mm-wave reader) to measure the RSS for each relevant steered beam transmitted from the reader device. In such embodiments, each beam RSS measured by the mm-wave detector may be stored by the MCU 516 until the RSS falls 3 dB below the peak (or any other to-be-determined level below the peak RSS). RSS as a function of Beam-ID LUT may be generated by the MCU 516 and reported to the reader device over a link established via the first communication module 510 of the transponder device 500 (e.g., a regular Aloha link).

With continued reference to FIG. 5, the micro-controller 516 (also referred to simply as a "controller") is configured to determine orientation information, representative of a relative orientation of the RFID transponder device 500 to the remote reader device, based on the received one or more second wireless signal. The reply wireless signal that is transmitted by the first communication module 510 (e.g., via the modulator 518 and the antenna 512) can then include at least some of the orientation information, as well as identification information associated with the transponder device 500 (e.g., an identifier that has been pre-stored, at the time of manufacture or subsequently, at a non-volatile memory device of the transponder device 500). In some implementations, the orientation information derived based on the second wireless signals may include signal strength values (e.g., RSS, or some other data representations of signal strength) measured for different wireless beams (e.g., millimeter-wave wireless beams generated by the remote device) that may be associated with respective beam identifiers. Thus, the transponder device 500 can compile data showing a pattern of varying signal strength values for the detected wireless beams, which can be indicative of the orientation of the receiving transponder device 500 to the remote device transmitting the wireless beams.

In some embodiments, the second communication module 550 may be configured to receive millimeter-wave wireless beams steerable, by the remote device, in interlaced timing mode (with the steering of the mm-wave transmitters not being done simultaneously), with the millimeter-wave wireless beams each being associated with respective beam identifiers, and with the orientation information (which may be included with the transmitted reply wireless signal) sent, comprising data representative of signal strength values, measured by the second communication module, for at least some of the respective millimeter-wave wireless beams identified by the respective identifiers. In such embodiments, the controller of the transponder device 500 may be configured to compile a table associating the signal strength values for the millimeter-wave wireless beams with the identifiers for the respective millimeter-wave wireless beams, and to produce a reduced table including signal strengths that are within a threshold signal level from a maximum signal strength identified in the table. In such embodiments, the orientation information included with the transmitted reply wireless signal may include data representative of the reduced table. In some cases, the controller of the transponder device 500 may be configured to stop detecting below a pre-defined level from peak RSS (−3 dB as an example) to save power assuming the scanning is far enough offset from the device location.

Figure 14:
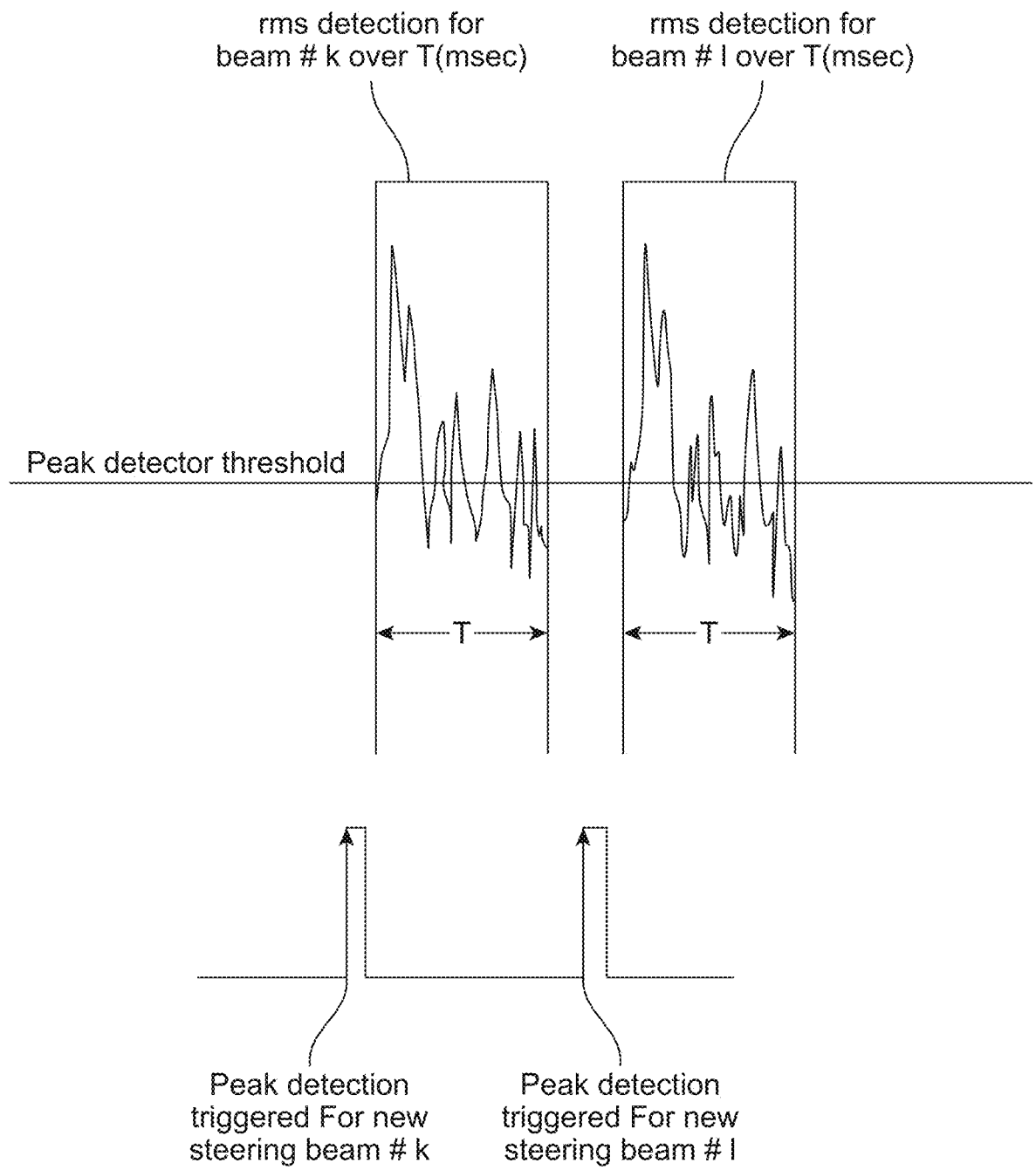
FIG. 14 is a timing diagram of received signal strength, peak detection, and root-mean-squared detection times.

The module 550 may be configured to perform peak detection and to respond to the detected peak value crossing some pre-defined value (that may be configured—see FIG. 14 example) by activating rms (root-mean-squared) detection over a pre-determined period of time (10 msec as an example) using all the chain elements (ADC and MCU) for saving power. In addition, the transponder device 500 may be configured to stop detecting in response to the received signal strength falling below a pre-defined level from peak RSS (−3 dB as an example) to save power assuming the scanning is far enough offset from the device location.

In some implementations, the orientation information may be used for determining (e.g., at the transponder device, at the remote device (e.g., a reader device) transmitting the first set of wireless signals and the second set of wireless signals, or some other remote device or server) location information for the RFID transponder device. For example, using the orientation information obtained via the measurements of the second wireless signals (e.g., mm-wave wireless beams), a distance between the remote device and the RFID transponder device may be derived based on a determination of a maximum signal strength from the measured signal strength values for the respective millimeter-wave wireless beams. Additionally or alternatively, using the orientation information determined by the transponder device, a direction from the remote device to the RFID transponder device may be derived based, for example, on interpolation (LMS interpolation) applied to at least some of the signal strength values measured by the second communication module of the RFID transponder device for the respective millimeter-wave wireless beams.

More particularly, consider a situation in which a transponder device (e.g., the RFID device 150 of FIG. 1, or the transponder device 500 of FIG. 5) receives a mm-wave from a remote reader (such as the reader device 110 of FIG. 1, which may be a stationary device with the mm-wave antenna array suspended from a ceiling, or may be a mobile reader device). As noted, in some embodiments, detection of mm-waves may commence in response to the transponder device first receiving a first wireless signal in a frequency band such as UHF, that causes the triggering of a process, at the transponder device, to detect and measure mm-wave signals (the receipt of UHF signals, or other relatively low frequency RF signals, may also be used to inductively power the transponder device). In this example scenario, the reader device (transmitting the mm-wave wireless beams) may be configured to scan over some radial (or rectangular) range of a sphere (e.g., scanning AZ: −60° to +60° and EL: −30° to +30° over the sphere) in, for example, 2° granularity (optionally, scanning granularity may start with a coarse 5° and then refined to 2°). In implementations in which the reader device's millimeter-wave transmitter is realized as a 64-element phased-array transmitter, the Array Factor (AF) at 5° phase offset from the peak falls by about −1 dB at 5°), which can be easily detected by a power detector. The phased array beam is generally symmetrical over AZ and EL and, therefore, spatial LMS interpolation over the −1 dB offset points (or any other to-be-determined level) from the beam peak curve will allow the beam to reach the estimated tag point $\hat{T}(x, y, z)$ steering direction with improved accuracy of about 1° (assuming a 64-element beam-steering transmitter with phase resolution of 45° and beam scanning resolution below 5°). The distance from the mm-waves transmitter to the responder device can be estimated using the selected beam with highest received signal strength (RSS). In some embodiments, the RSS can be calibrated in an on-going manner based on the anchor tag's RSS measurement changes compared to calibration readings/measurements. The distance may be determined as a function of the RSS. Specifically, at 5 meters, a measurement error of about 30 cm is expected (assuming that the power detection error is about 0.5 dB).

In some embodiments, positioning accuracy (to determine the approximate location of an RFID transponder) may be improved using two (or more) mm-wave transmitter devices. Each such reader device may be configured to transmit both a first set of wireless signals (e.g., at the UHF band) and to generate and transmit wireless beams at a second frequency band (e.g., mm-wave wireless beams), with each of the wireless beams being identifiable (e.g., uniquely identifiable) by associating identification values with the different beams.

Figure 6:
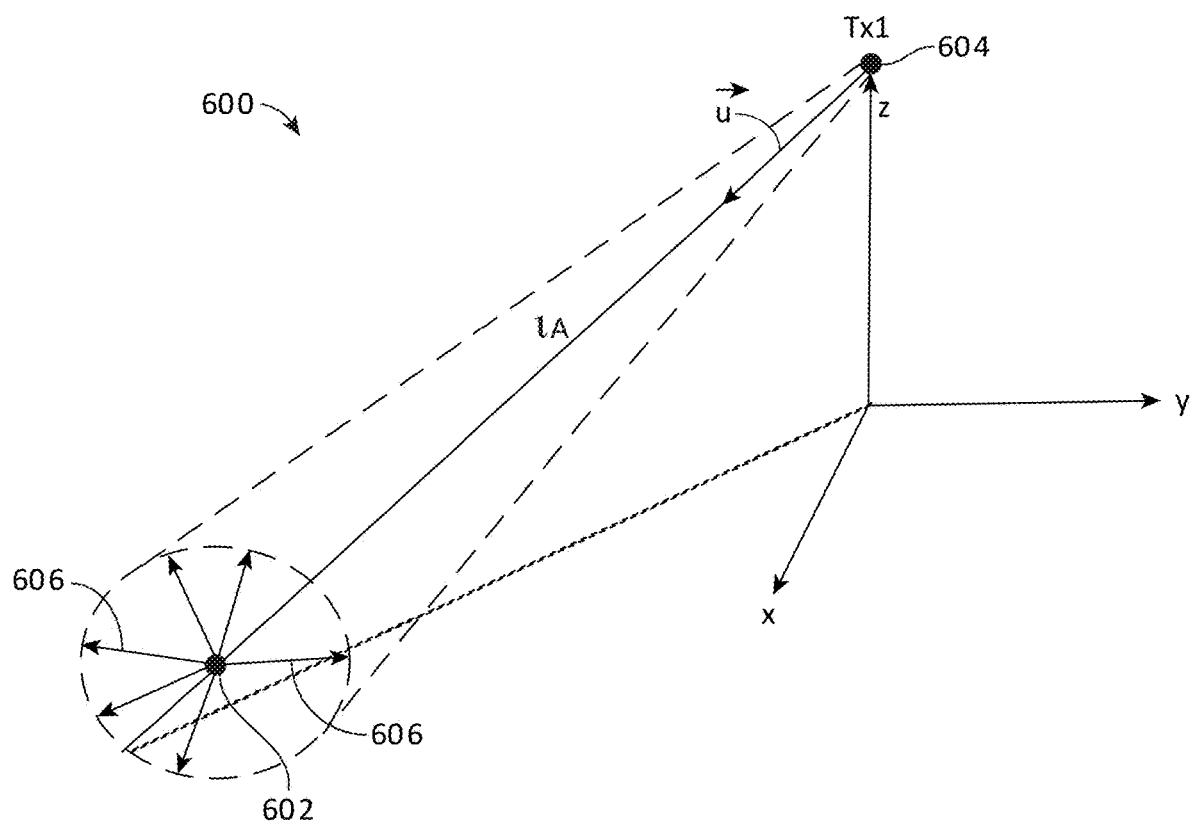
FIG. 6 is a diagram of line of sight from a single transmitter to an RFID transponder.
Figure 7A:
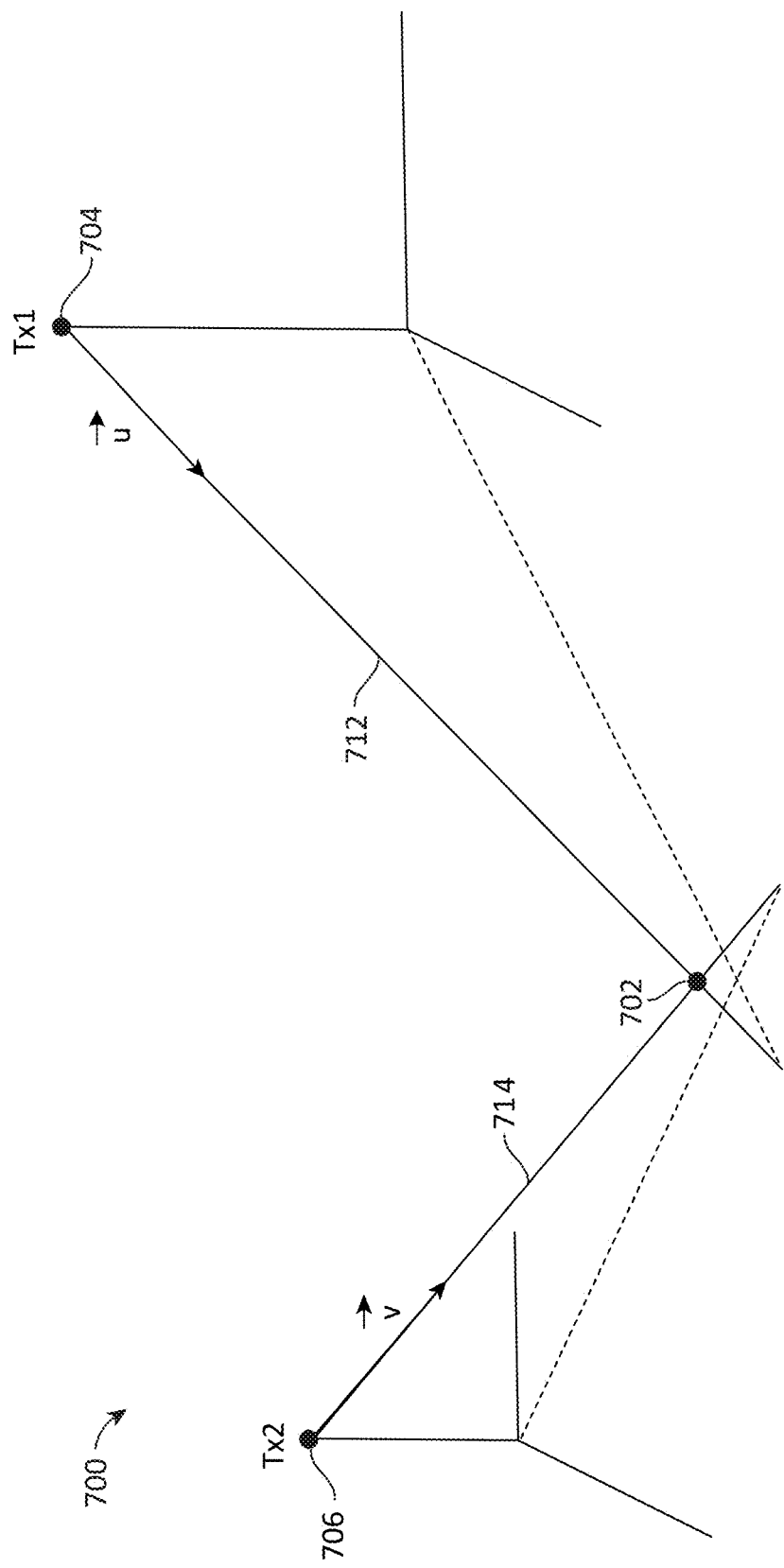
FIGS. 7A-7B are diagrams where a transponder has line of sight from two transmitters.
Figure 7B:
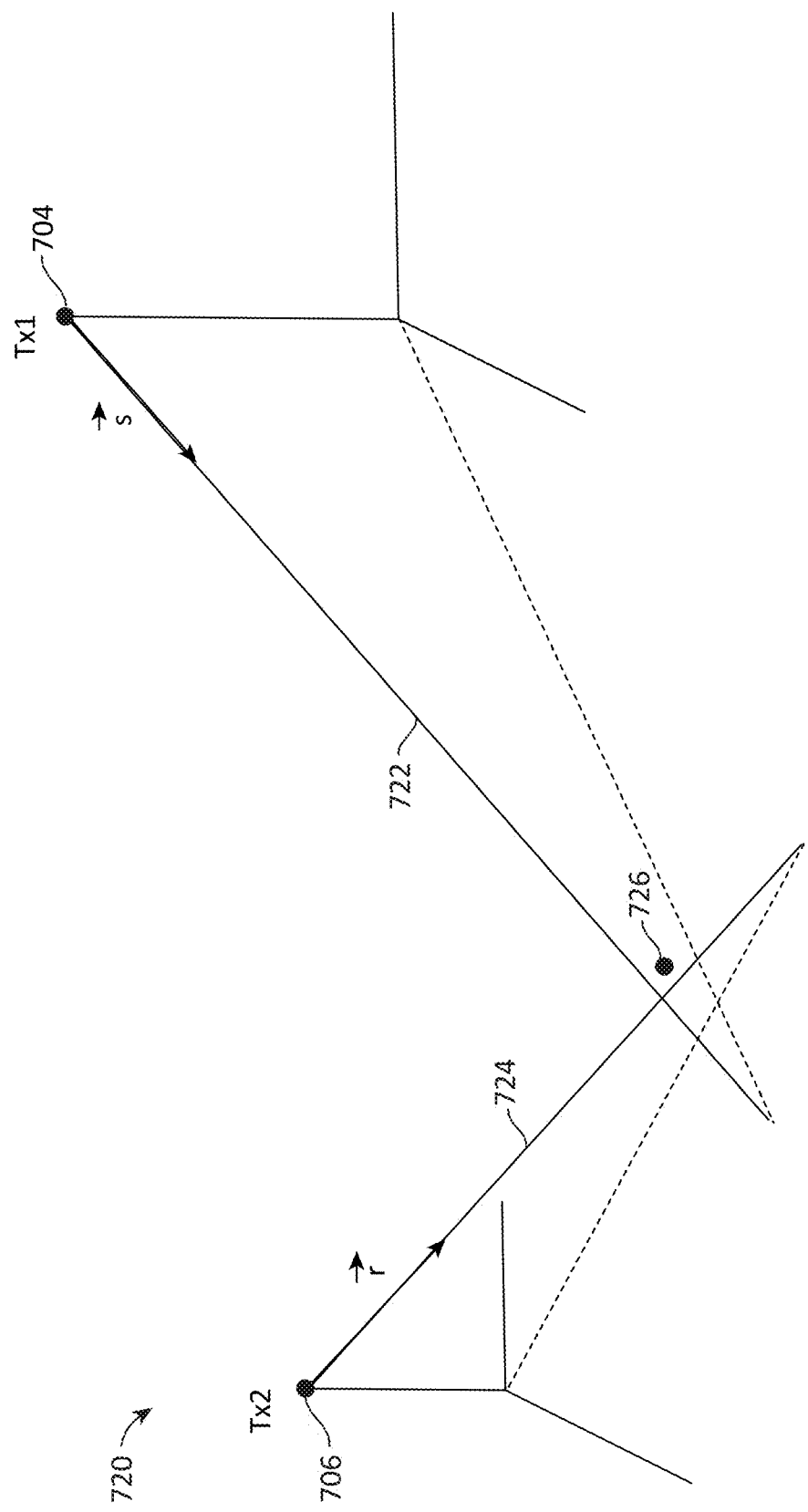

FIG. 6 shows a scenario 600 where a transponder tag 602 has line of sight (LOS) with a single mm-wave transmitter 604 (Tx1) while FIGS. 7A-7B show scenarios 700, 720 where a transponder tag 702 has LOS with two mm-wave transmitters 704, 706 (Tx1, Tx2). As shown, each of the mm-wave transmitters 604, 704, 706 transmits a wireless beam (e.g., mm-wave beams) for use in deriving a location approximation for the respective transponder 602, 702 located at a position T. Each of the mm-wave transmitters 604, 704, 706 may be similar in implementation and/or configuration to any of the mm-wave transmitters 222a-222d of FIG. 2, while the transponder 602, 702 may be similar, in implementation and/or configuration, to the transponder device 150, 152, and/or 154 of FIG. 1, or to the transponder device 500 of FIG. 5. The reader device determines the location of the tag 602 relative to the reader by determining an estimated distance $1_A$ (derived from peak RSS) from the reader, an estimated direction $\vec{u}$ from the reader, and the known location of the reader. The estimated direction $\vec{u}$ may be derived by applying LMS interpolation over the RSS table to find a likely direction in view of antenna pattern span limitations (due to implementation limits, e.g., maximum number of phased array elements) and steering resolution resulting in ambiguity 606 in the direction.

In the example of FIGS. 7A-7B, each of the mm-wave transmitters 704, 706 may be configured to scan over a range of AZ: −60° to +60° and EL: −30° to +30° over the sphere around the transmitter 704, 706 with, for example, a 2° granularity to provide the steering direction relative to the RSS. As noted, a 64-element phased-array transmitter typically has an Array Factor (AF) that falls of from the peak, at 5° phase offset, by about 1 dB (assuming a 64-element beam-steering transmitter with phase resolution of 45°). As also noted, the phased-array beam is symmetrical and, therefore, spatial LMS interpolation over the −1 dB offset points from the beam peak curve may result in estimation of the tag point $\hat{T}$(x, y, z) with improved accuracy of about 1° (beam calibration with anchor tags may improve accuracy).

When two transmitters are used (such as those depicted in FIGS. 7A-7B) to perform location determination for a transponder device (tag), a spatial triangulation procedure may be performed to derive RFID localization. The procedure may include compiling two tables to record the interlaced signal strengths (detected by the second communication module circuitry of the transponder device for the mm-wave wireless beams transmitted by the two transmitters) versus steering positions (as may be determined from identification values associated with the detected mm-wave wireless beams). Accordingly, the transponder device generates a table Rx1 of RSS-versus-beam position (corresponding to the mm-wave wireless beams from a first transmitter, e.g., the transmitter 704), and a table Rx2 of RSS-versus-beam-position (corresponding to the mm-wave wireless beams from a second transmitter, e.g., the transmitter 706). The transponder device may produce (by executing a process via the MCU 516, or via some other controller or processor device provided on the transponder device) a reduced Rx1 table by selecting the points within some threshold signal-strength value (e.g., −1 dB) from the peak (maximum) recorded signal strength value for wireless beams from the transmitter 704. Similarly, the table Rx2 may be reduced by selecting points in the table that are within some threshold signal value (e.g., −1 dB; the threshold value may be the same or different from the threshold value used to reduce the table Rx1) from the peak value recorded in the table for the wireless beams from the transmitter 706. Thus, in such embodiments, a controller of the transponder device may be configured to generate one or more tables associating the signal strength values for millimeter-wave wireless beams (transmitted from one or more transmitters) with the identifiers for the respective millimeter-wave wireless beams, and to produce one or more reduced tables including signal strengths that are within a respective threshold signal level from a maximum signal strength identified in the one or more tables, respectively. The orientation information included with the transmitted reply wireless signal may include, under these circumstances, data representative of the one or more reduced tables.

The points in the reduced tables (which may be referred to as the Rx11 RSS table and the Rx21 RSS table) may be associated with particular directions $\vec{u}$ and $\vec{v}$ (FIG. 7A) or $\vec{r}$ and (FIG. 7B) relative to the transmitters 704, 706. Initial localization may be done for the relevant combination of the transmitters 704, 706 using spatial triangulation (using known or determined locations for the transmitters 704, 706, and using the reduced tables Rx11 RSS and Rx21 RSS), to provide a spatial localization area with some ambiguity (the peak RSS is not definitive since the beam curve pattern is relatively flat and behaves like sin x/x). The localization ambiguity may be significantly reduced by applying spatial LMS interpolation over the RSS tables to estimate the direction of each transmitter ($\vec{u}$ and $\vec{v}$ for FIG. 7A and $\vec{r}$ and $\vec{s}$ for FIG. 7B) to the RFID transponder and then applying triangulation as appropriate in order to derive the RFID transponder location. That is, for example, if lines 712, 714 corresponding to the directions $\vec{u}$ and $\vec{v}$ intersect, then the intersection point is the (estimated) location of the RFID transponder 702. Otherwise, as with lines 722, 724 corresponding to the directions $\vec{r}$ and $\vec{s}$ that do not intersect, a location 726 where a combined distance to both of the lines 722, 724 of the directions $\vec{r}$ and $\vec{s}$ is smallest is the (estimated) location of the RFID transponder.

In some embodiments, location information for a transponder device may be determined (e.g., at the transponder device, at one of the reader devices transmitting the mm-wave wireless beams, at a location server, or at some other remote device) by deriving the location information based on at least part of a first table (e.g., the full table or reduced table described above) associating detected signal strengths for the millimeter-wave wireless beams transmitted by the second communication module of the reader device with the respective identifiers for the millimeter-wave wireless beams. Deriving the location information may further be based on at least part of a second table (the full second table or a reduced second table) associating detected set of reply wireless signals another set of signal strengths, detected by the transponder device for another set of millimeter-wave wireless beams transmitted by another transmitter of another device, with another set of respective identifiers associated with the other set of millimeter-wave wireless beams.

Figure 8:
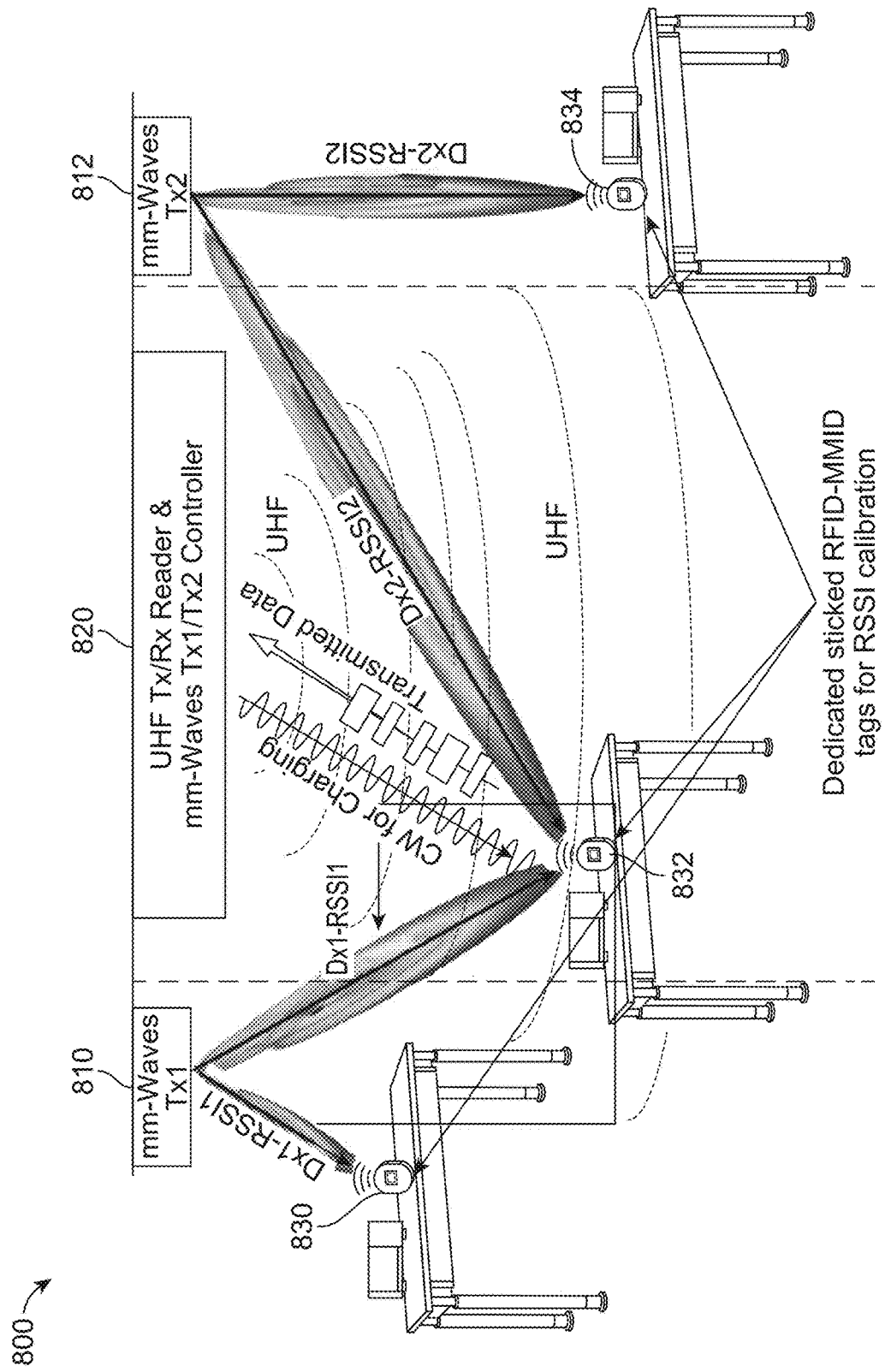
FIG. 8 is a diagram of an example system for performing calibration operations.

To improve localization/positioning accuracy, in some embodiments, one or more anchor tags, with fixed and known locations, may be deployed in the area in which localization/asset tracking is to be performed for transponder devices such as the transponder devices described herein fixed firmly (location of anchor tags is fixed). Thus, for example, referring to FIG. 8, a system 800 to perform calibration operations includes two transmitters 810, 812, which operate in conjunction with a reader/controller 820 (here a UHF Tx/Rx reader and mm-wave transmitter controller). The reader/controller 820 may include a first communication module to generate UHF signals to cause transponder devices to respond to those UHF signals (with a reply signal comprising identification data and orientation data derived from the mm-wave signals produced by the transmitters 810, 812 controlled by the reader/controller 820). In some implementations, the transmitters 810, 812 may form part of the reader/controller 820. Alternatively, and as depicted in FIG. 8, the transmitters 810, 812 may be separate devices (e.g., with separate housings) from the reader/controller 820. As also shown in FIG. 8, in this example, the reader/controller 820 and the transmitters 810, 812 are stationary devices suspended from a ceiling of a room in which the system 800 is implemented. However, in some examples, at least one of the transmitters 810, 812, and/or the reader/controller 820, may be disposed on a mobile device (and thus not have a fixed location).

As further illustrated in FIG. 8, anchor RFID-MMID devices 830, 832, 834 (each of which may be similar to the devices 150, 152, 154, 500, 630, and 740 of FIGS. 1, 5, 6, and 7) may be used for calibration of antenna gains to provide accurate RSS measurements for distance measurements. The devices 830, 832, 834 (more or fewer of such devices may be used) may be used for calibration of the beam pattern in a very fine phase resolution. The calibration procedure may be performed using a laser meter. Thus, in some embodiments, a controller, e.g., of the reader/controller 820, or of some other device that facilitates deriving the distance to, or positioning of, a transponder device, may be configured to perform localization operations based on a calibration procedure using one or more fixed RFID transponders with known locations.

The calibration procedure may include performing an accurate laser distance measurement so as to allow the RSS detector to be calibrated based on laser distance measurements. More particularly, anchor RFID-MMID tags with specified IDs may be deployed over the reader device's coverage area. Laser distance measurements between the reader device and the marked RFID-MMIDs may be performed (e.g., as a "one-time" procedure), e.g., during installation. Radio RSS measurements may be converted to distance and compared to the laser distance measurements. RSS calibration may be performed based on the difference between the laser distance measurements and the pre-calibration RSS measurements. Initial calibration values may be updated in an on-going manner since the anchored tags are scanned and report their RSS tables as well.

The antenna array factor (AF) may be calibrated as a function of scanning (steering direction) to represent real behavior of a phased array taking into account matching related issues that may be calibrated to support a refined spatial triangulation solution based on at least two estimated directions from transmitter RSS LUTs (e.g., to mitigate non-ideal $\vec{u}$ and $\vec{v}$ behavior impact on the LMS interpolation used to estimate transmitters' steering directions used for triangulation). Periodic calibration operations may be performed using the fixed anchor tags to compensate for temperature variations and one or more other time-based variations (e.g., transmit power variations, etc.) Reader localization has the option for aided calibration data for refining the triangulation based localization solution and/or the trilateration based localization solution.

The mm-wave AF may be calibrated as a function of steering direction making calibrated RSS LUTs over more than 20 dB of the mm-wave detector dynamic range (of the RFID transponder). A beam curve −1 dB offset pattern to AF peak is correlated upon the measured tag direction to each transmitter over the scanned local area of each anchor tag to support triangulation using LMS interpolation to estimate the mm-wave transmitter steering direction (towards the RFID transponder). Steering direction error can be reduced using anchor tags spread over the sphere for calibration.

On-going anchor tag readings may be used to compensate for transmitter RSS related changes over time/temperature by adjusting the changes of anchor tags with respect to the absolute measurements taken in the calibration phase.

Figure 9:
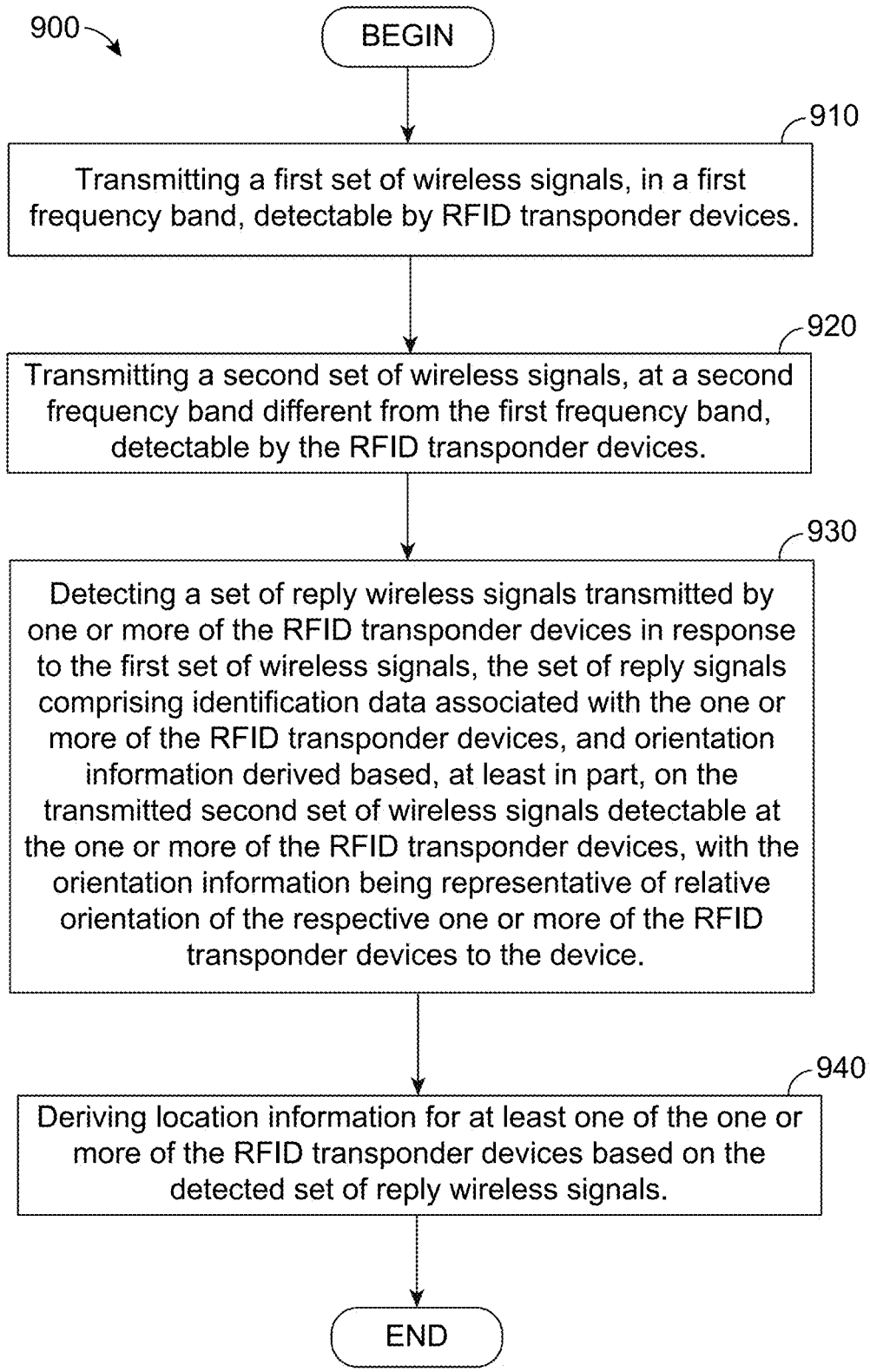
FIG. 9 is a flowchart of an example method to derive location information for a transponder device.

Referring to FIG. 9, with further reference to FIGS. 1-5 and 8, a flowchart of an example procedure 900, generally performed at a reader device (such as the reader device 110 or the reader device 200), to derive location information for a transponder device (e.g., the transponder devices 150, 152, 154, or 500), is shown. The procedure 900 includes transmitting 910 a first set of wireless signals, in a first frequency band, detectable by RFID transponder devices. As described herein, the first set of wireless signals may include UHF signals, or signals in some other low-frequency RF band, that can be detected by transponder devices (e.g., RFID transponder devices, which may be active or passive devices), in response to which the RFID transponder devices transmit a first set of reply signals (which may also be in the same first frequency band in which the first set of wireless signals were transmitted). When the first set of wireless signals, of the first frequency band, are received by passive transponder devices (e.g., using a circuitry similar to that included in the first communication module 510), a power harvester (such as the one shown in relation to the first communication module 510) may be used to inductively generate electrical current or voltage to allow storage of the inductively generated power (e.g., in a capacitor or battery). The harvested power can then be used to power at least the first communication module and/or the low-power second communication module that is configured to detect a second set of wireless signals (e.g., millimeter-wave wireless beams).

The procedure 900 further includes transmitting 920 a second set of wireless signals, at a second frequency band different from the first frequency band, detectable by the RFID transponder devices. For example, the second set of wireless signals may include millimeter (mm)-wave wireless signals, that are steered as mm-wave beams by a steering mechanism of the reader device (e.g., using a mm-wave antenna array). The steerable second set of wireless signals may be directed at different directions in a recurring (e.g., periodic) manner, to achieve a scanning pattern with controllable granularity (e.g., 5° for an initial coarse localization, and subsequently 2° granularity to achieve a more refined scanning). The mm-wave beam steering scanning is done in interlaced mode (with each transmitter scanning while others do not transmit). As described herein, the scanning pattern may be realized using two or more mm-wave phased-array transmitters (which may each include 64 controllable antenna elements; e.g., with the antenna elements selected, signal phase, signal frequency, etc. being controlled).

The procedure 900 further includes detecting 930 a set of reply wireless signals transmitted by one or more of the RFID transponder devices in response to (receiving) the first set of wireless signals, with the set of reply signals comprising identification data associated with the one or more of the RFID transponder devices, and orientation information derived based, at least in part, on the transmitted second set of wireless signals detectable at the one or more of the RFID transponder devices. The orientation information is representative of relative orientation of the respective one or more of the RFID transponder devices to the device. Thus, as described herein, the second wireless signals detected by one or more RFID transponder devices may be used to derive the orientation information indicative of the relative orientation of the one or more transponder devices to the reader device. For example, the transponder devices that detect the second set of wireless signals may measure signal strength for those detected wireless signals. Because the second set of wireless signals (e.g., mm-wave wireless beams) are associated with identifiers, a transponder device can associate the detected signals with measured signal strengths, and compile a table listing particular wireless beams with their respective measured signal strength (RSS). That information may, in some variation, be transmitted to the reader device via a communication link established with respect to the first set of wireless signals (e.g., in the first RF band corresponding to the first set of wireless signals). The table(s) compiled to associate wireless beams with measured signal strength may be reduced to remove/purge entries with a measured signal strength that is more than some threshold signal level (−1 dB or −3 dB) lower than the peak (maximum) signal strength value measured.

The procedure 900 further includes deriving 940 location information for at least one of the one or more of the RFID transponder devices based on the detected set of reply wireless signals. For example, deriving the location information may include deriving one or more of: 1) a distance between the reader device and the at least one of the one or more of the RFID transponder devices based on a determination of a maximum signal strength measured by the at least one of the one or more of the RFID transponder devices for the respective wireless beams, and/or 2) a direction from the device to the at least one of the one or more RFID transponder devices based on LMS interpolation applied to the signal strengths measured by the at least one of the one or more of the RFID transponder devices for the respective wireless beams. The location information may be an absolute location (e.g., coordinates of the location relative to a reference origin such as the origin of the Earth) determined using the distance and direction from the reader device to the transponder and a known location of the reader device (e.g., determined by using a satellite positioning system). Deriving the location information may also include performing a 3D triangulation procedure based on spatial LMS interpolation performed on, for example, the orientation information included in the detected set of reply signals. The triangulation procedure is generally performed on orientation information corresponding to measurements from mm-wave wireless beams transmitted by two (or more) different transmitters. As noted, at least some of the operations for deriving location information may be performed at a different device (e.g., a remote device, such as a location server, the RFID transponder device, etc.) than the reader device.

The reader device may communicate with a server to receive information from the server and/or to provide information to the server, e.g., regarding one or more transponders. A determined location of a transponder may be reported to a server, e.g., to crowdsource transponder location. For example, the reader device may determine that the location of a transponder corresponding to a particular identifier is different from a location indicated by a server for that identifier. This may indicate that the transponder has been undesirably moved, e.g., unintentionally moved by someone or something such as by a snowplow or other device moving a transponder without an operator or user knowing that the transponder has been moved. The reader device may respond by reporting the present location of the transponder. The reader device may communicate with the server via a wired connection and/or wirelessly, via one or more appropriate transceivers.

Figure 10:
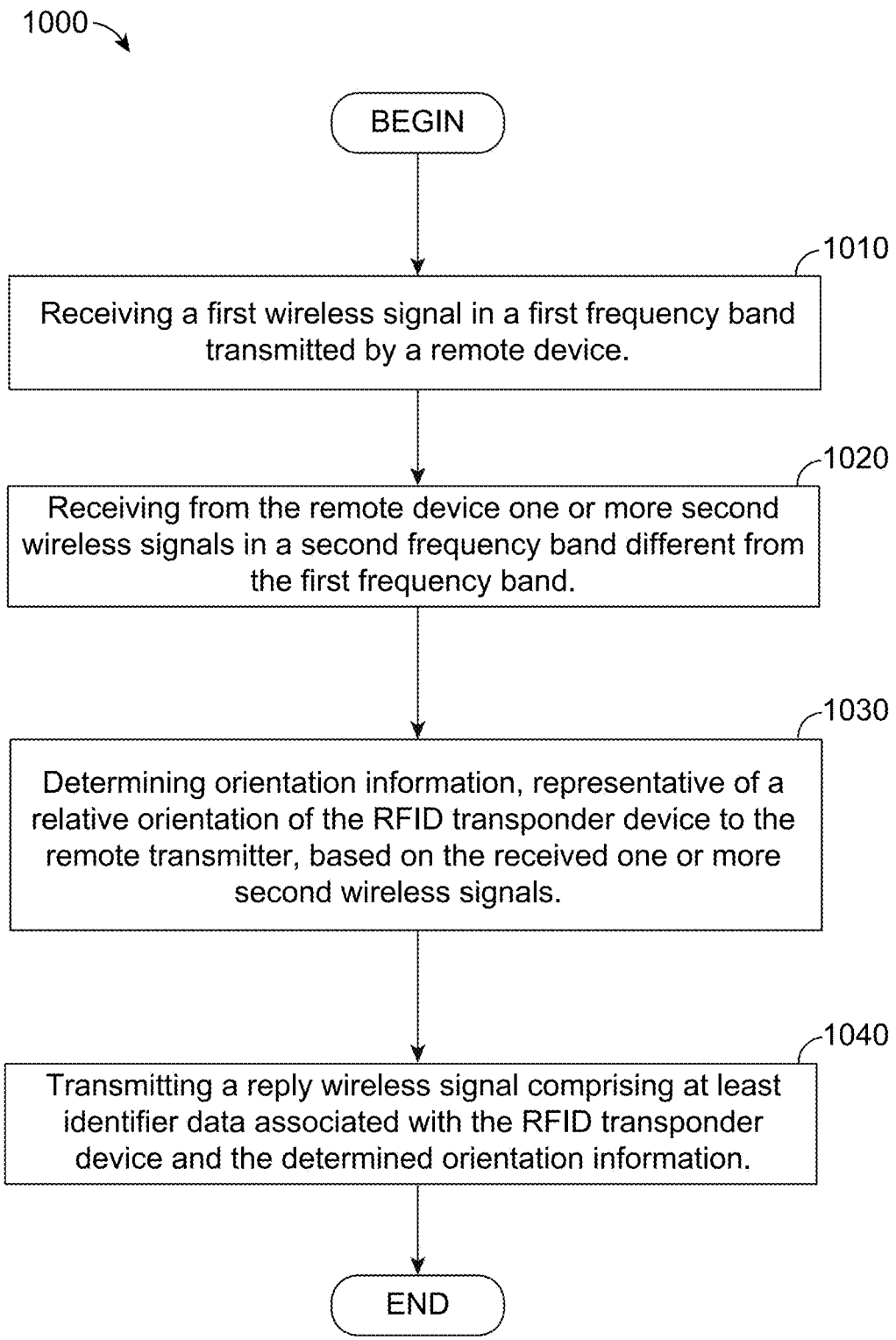
FIG. 10 is a flowchart of an example method to facilitate localization/positioning for the transponder device.

Referring to FIG. 10, with further reference to FIGS. 1-5 and 8, a flowchart of an example procedure 1000, generally performed at a transponder device (such as the transponder devices 150, 152, 154, 500), to facilitate localization/positioning for the transponder device, is shown. The procedure 1000 includes receiving 1010 a first wireless signal in a first frequency band transmitted by a remote device. For example, the first wireless signal may be a UHF signal transmitted by the remote device, which may be a reader device configured to control UHF and millimeter-wave transmitters, and to read a reply signal responsive to (receiving) the UHF signal (and generally transmitted in the UHF band). The procedure 1000 additionally includes receiving 1020 from the remote device one or more second wireless signals in a second frequency band different from the first frequency band. As noted, the one or more second wireless signals may include mm-wave wireless signals (mm-wave wireless beams generated by a beam-forming, or beam-steering, mechanism of the mm-wave transmitters, with such a beam-steering mechanism implemented, for example, using a phased millimeter-wave antenna array).

The procedure 1000 further includes determining 1030 orientation information, representative/indicative of a relative orientation of the RFID transponder device to the remote transmitter, based on the received one or more second wireless signals. For example, as described herein, determining the orientation information may include measuring signal strength for the detected mm-wave wireless beams, with the different mm-wave beams being associated with respective identification values. The detector of the transponder device (e.g., the detector 556, operating in conjunction with the MCU 516) may compile tables with signal strength values provided for the different detected beams. The compiled table may be processed to, for example, reduce the number of entries (e.g., retain only signal strength measurements that are within a threshold signal strength level, such as −1 dB or −3 dB, of the peak signal strength). As also shown in FIG. 10, the procedure 1000 includes transmitting 1040 a reply wireless signal comprising at least identifier data associated with the RFID transponder device and the determined orientation information. The orientation information is included with the same reply signal that is transmitted in response to receiving the first wireless signal (e.g., the UHF wireless signal), with the orientation information piggybacking on the communication that is used to send the RFID transponder device identification data, and without sending the orientation information over a separate link (e.g., in the millimeter-wave band). The orientation information received by the remote device can be used to perform localization/positioning operations with respect to the RFID transponder device.

Figure 11:
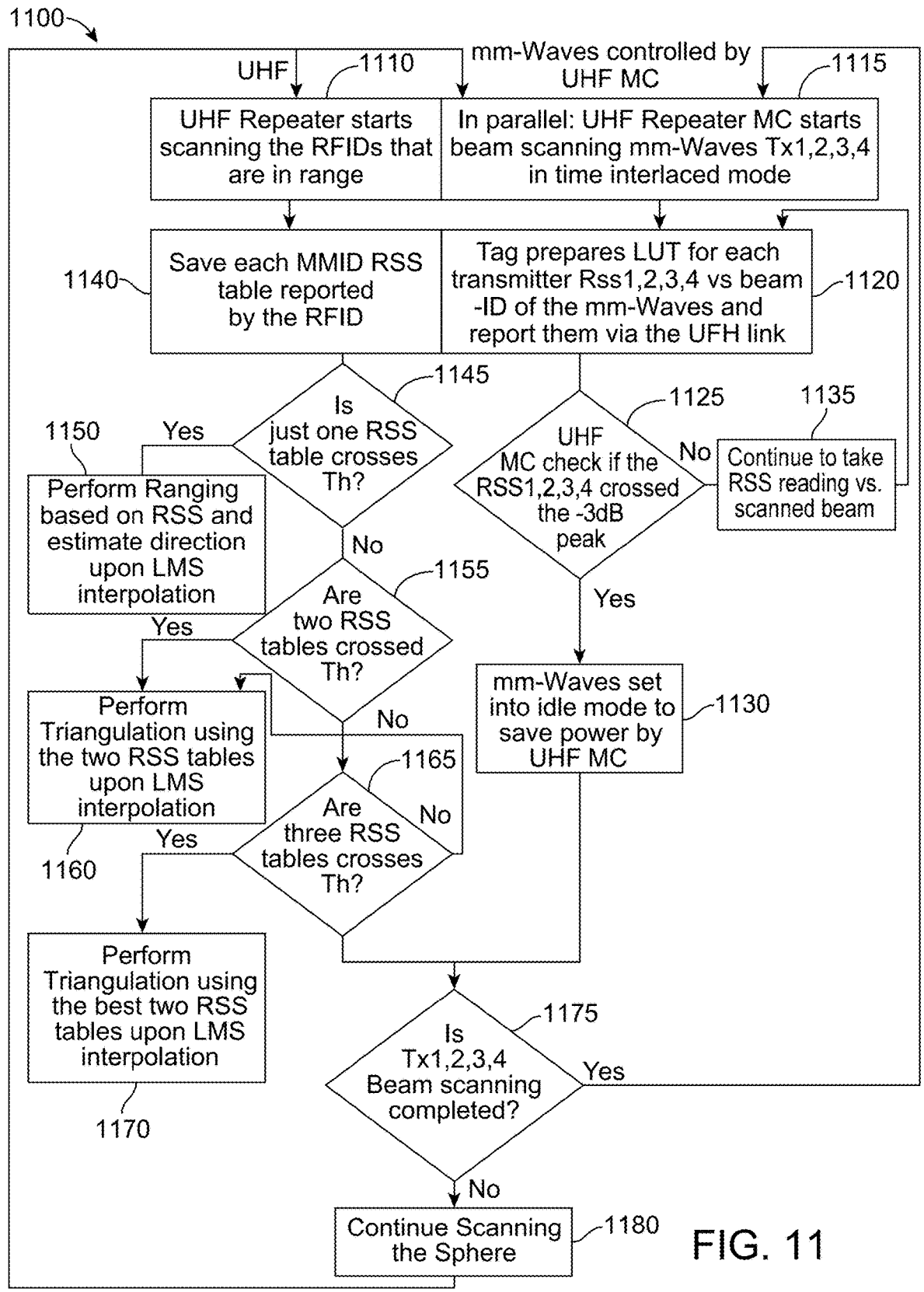
FIG. 11 is a flowchart of an example method to implement operations and functions to facilitate localization/positioning for a transponder device.

Referring to FIG. 11, with further reference to FIGS. 1-8, a flowchart of an example procedure 1100 to implement operations and functions to facilitate localization/positioning for a transponder device (such as the transponder devices 150, 152, 154, 500, 602, 702) is shown. The procedure 1100 may be performed at various devices used to realize the systems described herein, including at a reader device (such as the reader device 110, 200), one or more transponder device, and/or some other device. The procedure 1100 may be part of, or include at least some of the operations of the procedures 900 and 1000 described in relation to FIGS. 9 and 10.

For example, the procedure 1100 may be used to determine location of a transponder. If there is a single set of received signal strength information measured by the transponder from a mm-wave transmitter, then the reader (e.g., the reader 110) can determine the direction and distance from the mm-wave transmitter to the transponder and determine the location of the transponder using this information and the location of the mm-wave transmitter. If there are two sets of RSS information measured by the transponder from two mm-wave transmitters, then the reader may estimate a line (direction) between each of the mm-wave transmitters and the transponder based on the RSS information. The reader may determine whether the lines intersect. If the lines intersect, then the reader may determine the transponder location as the intersection point. If the lines do not intersect, then the reader may determine the transponder location as the point where the combined distance to the two lines is smallest. If there are three (or more) sets of measured RSS data, then the reader may select two sets of RSS data and proceeding as discussed in this paragraph for two sets of RSS information. Also or alternatively, the reader may estimate lines between each of the transmitters and the transponder and determine whether all the lines intersect at a single point. If the lines intersect at a single point, then the reader may determine the transponder location as the intersection point. If all the lines do not intersect at a single point, then the reader may determine the transponder location as the point where the combined distance to the all the lines is smallest.

A UHF repeater (transmitter) of the reader device may initially start scanning, at 1110, for RFID transponder devices that are within range of the UHF repeater. The transmitted signals may be sent over an Aloha-type link. In some embodiments, different RF bands (non-UHF) may be used for scanning for RFID transponder devices. Concomitantly or subsequent to the transmission of the UHF scanning signals, mm-wave wireless beams are transmitted, at 1115, in a scanning pattern realized, for example, through control of two or more mm-wave phased array antennas that are controlled by (and/or may form part of) the reader device. The scanning pattern is performed in a time interlaced mode to scan a spherical area (or scan at least part of a spherical area). As discussed herein, an initial mm-wave scan may be performed with a beam granularity (resolution) that is relatively coarse (e.g., 5°), and upon determining approximate locations of RFID transponder devices in the area scanned (determined based on reply signals resulting from the UHF and mm-wave scan), a more refined granularity (e.g., 2°) may be used for subsequent scans. The mm-wave scan may commence as determined by RFID transponder devices, deployed in the area being scanned, based on reply signals responsive to the UHF signals transmitted by the UHF transmitter (implemented for the first communication module) of the reader device.

A mm-wave receiver of each RFID transponder device receives 1120 mm-wave wireless beams from the different mm-wave transmitters deployed in the area. The mm-wave wireless beams are each associated with identification values (IDs), which may be included (encoded or modulated) into the mm-wave wireless beams, or may otherwise be determined from the signals. A detector of each receiver circuitry is configured to determine signal strength value for each of the received beams, which may be compiled in look-up tables (LUT) (e.g., by a controller or processor of the RFID transponder device listing for the different beams, as identified by their identification values, their respective signal strengths). A determination may be made, at 1125, of whether the signal strength for beams received from a particular mm-wave transmitter have fallen off more than −3 dB (or some other value) from the recorded peak (maximum) signal strength value. If so, measurements for signals from that transmitter (or from all mm-wave transmitters) may cease, and/or signal transmissions from the respective transmitters may also cease (at 1130). Otherwise, if signal strength level (for mm-wave beams from a particular transmitter or for any transmitter) has not yet fallen off more than −3 dB, signal strength measurements for scanned beams continue (at 1135).

As described herein, table data (corresponding to orientation information) produced by an RFID transponder device is sent to the reader device (e.g., once all tables with measurements for the signals from the different mm-wave transmitters have been compiled), and the reader device saves the table data (at 1140). The orientation data (table data) is included in a reply signal transmitted over a communication link that is established using the first communication module of the reader device (e.g., the UHF transceiver or UHF receiver of the reader device). For example, the communication link used to send the table data with the measurements for the mm-wave wireless beams may be an Aloha link. The reply signal also includes identification data associated with the RFID transponder device. As noted, the reply signal may be responsive to the first set of wireless signals (e.g., the UHF signals), with the orientation data effectively piggybacking on that reply signal.

Having received the orientation data (e.g., the RSS tables reported by an RFID transponder device via, for example, a UHF reply signal), a determination is made, at 1145, as to whether only one RSS table is available (or, alternatively, whether measurements in only one table exceed some signal strength threshold; i.e., in situations where measurements for signals from other transmitters were too weak to be reliable). If there is only one set of measurements (only one table), then ranging operations based on the RSS measurement in that one table are performed at 1150. Additionally, an estimate of a direction (of the transponder device relative to the mm-wave transmitter) is performed using, for example, an LMS interpolation procedure (also at 1150).

If it is determined, at 1155, that there are two RSS tables with measurements that exceed the signal strength threshold (i.e., there are two tables with RSS measurements that are reliable enough to be used for performing localization operations), an LMS-interpolation-based triangulation process is performed, at 1160, using the measurements from those two RSS tables. If it is determined, at 1165, that there are three RSS tables with measurements that exceed the signal strength threshold (i.e., there are three tables with RSS measurements that are reliable enough to be used for performing localization operations), an LMS-interpolation-based triangulation process is performed, at 1170, using the measurements from two selected RSS tables, e.g., the two RSS tables having the highest RSS values (and thus likely corresponding to the closest transmitters), or the two RSS tables having higher RSS gradients over the measured RSS values. Alternatively, a 3D trilateration process may be performed using the three available RSS tables (e.g., where peak RSS values and gradients are close between RSS tables) to perform localization/positioning for the RFID transponder device. While the localization procedures (at 1150, 1160, and 1170) may be performed at the reader device, at least some (and possibly all) of the operations may be performed at some other remote device (e.g., a location server). Furthermore, at least some of the localization/ positioning procedures may be performed locally at the RFID transponder device that performed the signal strength measurements for the mm-wave wireless beams. The procedure 1100 further determines, at 1175, if beam scanning is completed. If beam scanning is not completed, then scanning of the spherical area containing the RFID transponder devices continues (at 1180).

While the systems, methods, and other implementations described herein were described in relation to determining positions of RFID transponder devices and/or tracking transponder devices as they move within some areas, the systems, methods, and other implementations described herein may be used to implement other applications. For example, UHF-mm-wave-based localization implementation may be used to control operation and movement of a robot. Thus, the reader device described herein may include (or may be fitted on) a robotic mechanism to control movement of the reader device based, at least in part, on the orientation information included in the set of reply signals.

Figure 12:
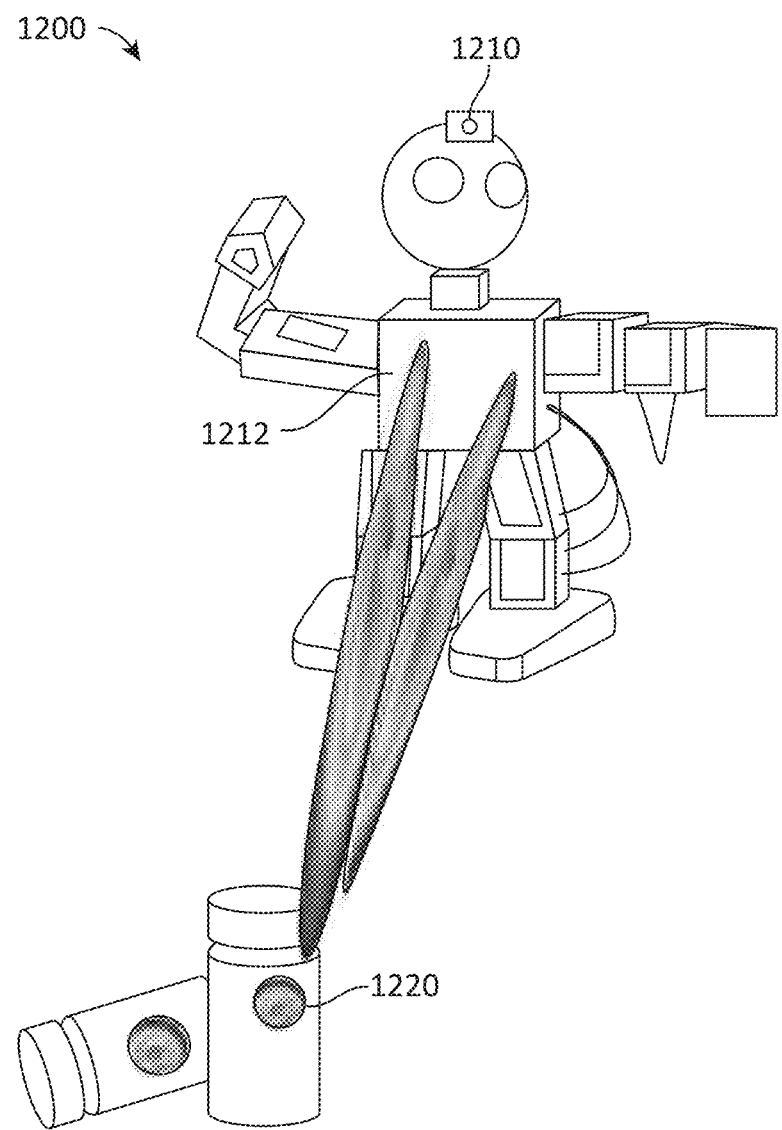
FIG. 12 is a diagram of an example system for autonomous navigation.

More particularly, with reference to FIG. 12, a diagram of an example system 1200 that includes a robot 1210 configured for autonomous navigation within an area that includes one or more RFID transponder devices (similar to the transponder devices described herein) is shown. The robot 1210 may be equipped with at least one UHF antenna and up to ×4 mm-wave transmitters (collectively marked as a unit 1212) to implement localization over a local area of approximately 5 meters with sub-centimeter accuracy. At a distance range of 0.5 to 5 meters, the robot will operate similar to the assets/goods tracking described herein, providing accuracy of about 5.5 cm. When the robot 1210 reaches about 0.5 meter distance from an object 1220 (which may be equipped with a transponder device similar to, in implementation and/or configuration, the transponder devices 150, 152, 154, 500), the robot 1210 may switch to "near distance mode," activating mm-wave reader receivers supporting "sub-centimeter" accuracy by using one of the following modes: 1) mm-wave backscattering operation (instead of mm-wave detection) making redundant the backscattered UHF signals data representative of measured mm-wave beams (the mm-wave backscatter circuit may be powered by a UHF harvester that inductively generates power from received UHF, or other low frequency RF signals), 2) modulated mm-wave local oscillator with randomized PRB (pseudo randomized burst) wide-bandwidth radar pulse (and powered by the UHF harvester).

Applying a mm-wave detection solution (for the tracked RFID-MMID) as discussed herein, rather than switching to back-scattering in mm-waves when the robot 1210 gets close to the tag, may avoid the use of reader mm-wave receivers (just steering transmitters). Further, such a solution may avoid processing of multi-burst transmissions from RFID-MMID tags in mm-wave frequencies in addition to in UHF frequencies as mm-wave RSS LUT tables are reported via a UHF transponder. Further, when the robot 1210 reaches a distance below 50 cm relative to the reader, the localization accuracy based on mm-wave RSS detection may be on the order of about 7 mm (already in the order of sub-cm accuracy).

Figure 13:
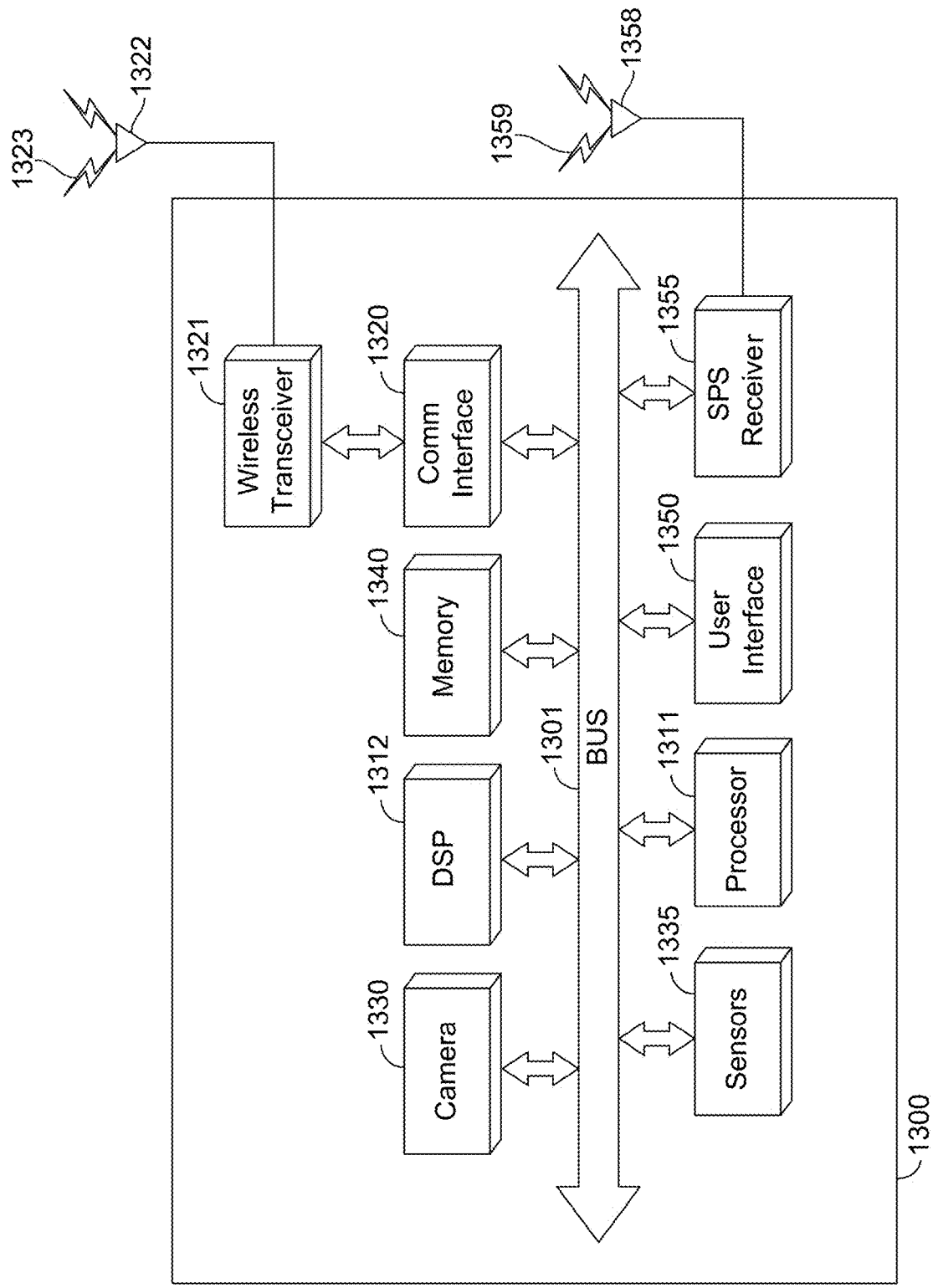
FIG. 13 is a diagram of an example processor-based device configured to perform methods and procedures described herein.

Referring now to FIG. 13, a processor-based device 1300 is illustrated for which various procedures and techniques described herein can be utilized. The device 1300 may be used, at least in part, to implement any of the various devices described herein, including the various transponder devices, reader devices, transmitters, etc., illustrated in the various figures discussed herein.

The device 1300 includes a processor 1311 (or processor core) and memory 1340. The device 1300 may be configured to transmit wireless signals in two different frequency bands (when the UE 1300 is used to implement a reader device), and/or, when the device 1300 is used to implement an RFID transponder, to receive and measure signals from two different bands (UHF and mm-wave) and determine orientation information to be sent with a reply signal transmitted in one of those bands (e.g., UHF). The device 1300 may optionally include a trusted environment operably connected to the memory 1340 by a public bus 1301 or a private bus (not shown). The device 1300 may also include a transceiver 1315 configured to communicate with one or more other devices via one or more wired connections, a communication interface 1320, and a wireless transceiver 1321 configured to send and receive wireless signals 1323 via a wireless antenna 1322 over a wireless network. The wireless transceiver 1321 is connected to the bus 1301 via the communication interface 1320. Here, the device 1300 is illustrated as having a single wired transceiver 1315 and a single wireless transceiver 1321. However, the device 1300 can alternatively have multiple wired transceivers 1315 and/or multiple wireless transceivers 1321 and/or multiple wireless antennas 1322 to support multiple communication standards such as Wi-Fi, CDMA, Wideband CDMA (WCDMA), Long Term Evolution (LTE), 5G, Bluetooth® short-range wireless communication technology, other types of short-range technologies (e.g., implemented based on UHF RF technology, millimeter-wave RF technology), etc. As described herein, at least one wireless transceiver may be a UHF transceiver configured to communicate with another device over a UHF frequency band. Instead of having a transceiver, a transmitter, such as a millimeter-wave wireless transmitter or an mm-wave wireless receiver may be used.

The communication interface 1320 and/or the wireless transceiver 1321 may support operations on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, control information, overhead information, data, etc.

The device 1300 may also include a user interface 1350 (e.g., display, graphical user interface (GUI)), and a Satellite Positioning System (SPS) receiver 1355 that receives SPS signals 1359 (e.g., from SPS satellites) via an SPS antenna 1358 (which may be the same antenna as wireless antenna 1322, or may be different). The SPS receiver 1355 can communicate with a single global navigation satellite system (GNSS) or multiple such systems. A GNSS can include, but is not limited to, Global Positioning System (GPS), Galileo, Glonass, Beidou (Compass), etc. SPS satellites are also referred to as satellites, space vehicles (SVs), etc. The SPS receiver 1355 measures the SPS signals 1359 and may use the measurements of the SPS signals 1359 to determine the location of the device 1300. The processor 1311, the memory 1340, the Digital Signal Processor (DSP) 1312 and/or specialized processor(s) (not shown) may also be utilized to process the SPS signals 1359, in whole or in part, and/or to compute (approximately or more precisely) the location of the device 1300, in conjunction with SPS receiver 1355. Alternatively, the device 1300 may support transfer of the SPS measurements to a location server (e.g., E-SMLC (Evolved Serving Mobile Location Center, etc.) that computes the location of the device 1300. Storage of information from the SPS signals 1359 or other location signals is performed using the memory 1340 or registers (not shown). While only one processor 1311, one DSP 1312, and one memory device 1340 are shown in FIG. 13, other quantities of any of these components could be used in the device 1300. The processor 1311 and the DSP 1312 associated with the device 1300 are connected to the bus 1301.

The memory 1340 can include a non-transitory computer-readable storage medium (or media) that stores functions as one or more instructions or code. Media that can make up the memory device 1340 include, but are not limited to, RAM, ROM, FLASH, disc drives, etc. In general, the functions stored by the memory 1340 are executed by general-purpose processor(s), such as the processor 1311, specialized processors, such as the DSP 1312, etc. Thus, the memory device 1340 may be a processor-readable memory that stores software (programming code, instructions, etc.) configured to cause the processor(s) 1311 and/or the DSP(s) 1312 to perform the functions described. Alternatively, one or more functions of the device 1300 may be performed in whole or in part in hardware.

The device 1300 can estimate its current position within an associated system using various techniques, based on other communication entities within view and/or information available to the device 1300. For instance, the device 1300 may estimate its position using information obtained from base stations, access points (APs) associated with one or more wireless local area networks (WLANs), personal area networks (PANs) utilizing a short-range wireless communication technology such as Bluetooth® wireless technology or ZIGBEE®, etc., a Global Navigation Satellite System (GNSS) or another Satellite Positioning System (SPS) satellites, and/or map data obtained from a map server or other server (e.g., an E-SMLC or an SLP (SUPL (Secure User Plane Location) Location Platform). In some cases, a location server, which may be an E-SMLC, SLP or Standalone Serving Mobile Location Center (SAS), etc., may provide assistance data to the device 1300 to allow or assist the device 1300 to acquire signals (e.g., signals from WWAN (Wireless Wide-Area Network) base stations, signals from WLAN APs, signals from cellular base stations, GNSS satellites, etc.) and make location-related measurements using these signals. The device 1300 may provide the measurements to the location server (or some other device) to compute a location estimate or may compute a location estimate itself based on the measurements and possibly based also on other assistance data provided by the location server (e.g. such as orbital and timing data for GNSS satellites, configuration parameters for the PRS (positioning reference signal) signals, the precise location coordinates of WLAN APs and/or cellular base stations, etc.)

In some embodiments, the device 1300 may include a camera 1330 (e.g., front and/or back facing) such as, for example, complementary metal-oxide-semiconductor (CMOS) image sensors with appropriate lens configurations. Other imaging technologies such as charge-coupled devices (CCD) and back side illuminated CMOS may be used. The camera 1330 may be configured to obtain and provide image information to assist in positioning of the device 1300. In an example, one or more external image processing servers (e.g., remote servers) may be used to perform image recognition and provide location estimation processes. The device 1300 may include other sensors 1335 which may also be used to compute, or used to assist in computing, a location for the device 1300. The sensors 1335 may include one or more inertial sensors (e.g., accelerometers, gyroscopes, magnetometers), a compass (with any of the inertial sensors and/or compass possibly being implemented based on micro-electro-mechanical-system (MEMS) technology), a barometer, a thermometer, or a hygrometer, and/or one or more other sensors.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram, flowchart, or block diagram. Although each may describe the operations as a sequential process, many of the operations can be performed in parallel or concurrently. In addition, the order of the operations may be rearranged. A process may have additional operations not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, a mobile device or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") also includes devices which communicate with a personal navigation device (PND), such as by short-range wireless, infrared, wireline connection, or other connection, regardless of whether satellite signal reception, assistance data reception, and/or position-related processing occurs at the device or at the PND. Also, "mobile station" includes devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device may also be referred to as a mobile terminal, a terminal, a user equipment (UE), a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not comply with part or all of such one or more standards.

Although particular examples have been disclosed herein in detail, this has been done for purposes of illustration only, and is limiting with respect to the scope of the appended claims, which follow. In particular, various substitutions, alterations, and modifications may be made without departing from the spirit and scope of the invention as defined by the claims. Other aspects, advantages, and modifications are within the scope of the following claims. The claims presented are representative of the examples and features disclosed herein. Other unclaimed examples are within the scope of the following claims.

What is claimed is:

1. A device comprising:
 a transceiver configured to:
  transmit a first set of wireless signals, in a first frequency band, detectable by RFID (radio frequency identification) transponder devices;
 a transmitter configured to:
  transmit a second set of wireless signals, at a second frequency band different from the first frequency band, detectable by the RFID transponder devices; and
 a controller communicatively coupled to the transceiver and the transmitter, wherein the controller is configured to:
  receive, via the transceiver, a set of reply wireless signals, in the first frequency band, from one or more of the RFID transponder devices responsive to the first set of wireless signals, wherein the set of reply wireless signals comprising identification information that are associated with the one or more of the RFID transponder devices and orientation information that is representative of relative orientation of the respective one or more of the RFID transponder devices to the device, and wherein the orientation information is based on the second set of wireless signals; and
  determine location information for at least one of the one or more of the RFID transponder devices based on the identification data and the orientation information.

2. The device of claim 1, wherein the transceiver is configured to transmit the first set of wireless signals as radio frequency wireless signals with frequencies below 6 GHz.

3. The device of claim 2, wherein the transceiver is configured to transmit the first set of wireless signals as UHF (ultra-high frequency) wireless signals.

4. The device of claim 3 wherein the transceiver is configured to transmit the first set of wireless signals to include identifiers of the second set of wireless signals.

5. The device of claim 1, wherein the transmitter comprises a beam steering mechanism configured to transmit millimeter-wave wireless signals interlaced in time from one or more steering beam millimeter-wave transmitters with different locations connected and controlled by the controller.

6. The device of claim 5, wherein the transmitter is configured to transmit the second set of wireless signals associated with respective beam identifiers, and wherein the controller is configured to determine location information for at least one of the one or more of the RFID transponder devices based on signal strength values included in the orientation information.

7. The device of claim 6, wherein the controller is configured to:
 determine a distance between the device and the at least one of the one or more of the RFID transponder devices based on a determination of a maximum signal strength measured by the at least one of the one or more of the RFID transponder devices for the respective wireless beams; and
 determine a direction from the device to the at least one of the one or more of the RFID transponder devices based on least mean squared interpolation applied to signal strengths measured by the at least one of the one or more of the RFID transponder devices for the respective wireless beams.

8. The device of claim 7, wherein the controller is configured to determine the distance between the device and the at least one of the one or more of the RFID transponder devices further based on a distance calibration procedure using a plurality of fixed RFID transponders.

9. The device of claim 6, wherein the controller is configured to determine the location information based on at least part of a first table associating detected signal strengths for the millimeter-wave wireless signals transmitted by the transmitter with the respective identifiers for the millimeter-wave wireless signals, and further based at least part on a second table associating another set of signal strengths, detected by the at least one of the one or more of the RFID transponder devices for another set of millimeter-wave wireless signals transmitted by another transmitter of another device, with another set of respective identifiers associated with the other set of millimeter-wave wireless signals.

10. The device of claim 1, wherein the controller is configured to determine the location information for a particular RFID transponder device of the one or more of the RFID transponder devices by:
 estimating a first line between a first mm-wave transmitter and the particular RFID transponder device based on signal strengths measured by the particular RFID transponder device from the first mm-wave transmitter;
 estimating a second line between a second mm-wave transmitter and the particular RFID transponder device based on the signal strengths measured by the particular RFID transponder device from the second mm-wave transmitter;
 determining whether the first line intersects the second line; and
 either:
  in response to determining that the first line intersects the second line, determining a location of the particular RFID transponder device as an intersection point of the first line and the second line; or
  in response to determining that the first line does not intersect the second line, determining the location of the particular RFID transponder device as a location where a combined distance to the first line and the second line is smallest.

11. The device of claim 10, wherein the controller is configured to estimate the first line and the second line using least mean squared interpolation applied to the signal strengths measured by the particular RFID transponder device from the first mm-wave transmitter and from the second mm-wave transmitter, respectively.

12. The device of claim 1, wherein the controller is configured to determine the location information for a particular RFID transponder device of the one or more of the RFID transponder devices based on three sets of received signal strength measured by the particular RFID transponder device from first, second, and third mm-wave transmitters, respectively, by either:
 (1) selecting two sets of received signal strength from the three sets of received signal strength, the selected two sets of received signal strength corresponding to the first mm-wave transmitter and the second mm-wave transmitter;
 estimating a first line and a second line between the first mm-wave transmitter and the second mm-wave transmitter, respectively, and the particular RFID transponder device based on the selected two sets of received signal strength;

determining whether the first line and the second line intersect; and either:
in response to determining that the first line intersects the second line, determining a location of the particular RFID transponder device as an intersection point of the first line and the second line; or
in response to determining that the first line does not intersect the second line, determining the location of the particular RFID transponder device as a location where a combined distance to the first line and the second line is smallest; or (2) estimating first, second, and third lines between the first, second, and third mm-wave transmitters, respectively, and the particular RFID transponder device based on the three sets of received signal strength;
determining whether the first line, the second line, and the third line intersect at a single point; and
either:
in response to determining that the first line, the second line, and the third line intersect at the single point, determining the location of the particular RFID transponder device as the single point; or
in response to determining that the first line, the second line, and the third line do not intersect at the single point, determining the location of the particular RFID transponder device as a location where the combined distance to the first line, the second line, and the third line is smallest.

13. The device of claim 11, wherein the controller is configured to select two of the first line, the second line, and the third line based on received signal strength table quality.

14. The device of claim 1, wherein the location information for the at least one of the one or more of the RFID transponder devices includes an absolute location of one of the at least one of the one or more of the RFID transponder devices.

15. An RFID (radio frequency identification) transponder device comprising:
a transceiver configured to:
receive a first wireless signal in a first frequency band transmitted by a remote device, and
transmit a reply wireless signal comprising at least identifier data associated with the RFID transponder device;
a receiver configured to receive from the remote device one or more second wireless signals in a second frequency band different from the first frequency band; and
a controller communicatively coupled to the transceiver and the receiver and configured to determine orientation information, representative of a relative orientation of the RFID transponder device to the remote device, based on the one or more second wireless signals;
wherein the reply wireless signal further comprises the determined orientation information.

16. The RFID transponder device of claim 15, wherein the receiver is configured to receive millimeter-wave wireless beams steerable, by the remote device, in interlaced timing mode.

17. The RFID transponder device of claim 16, wherein the millimeter-wave wireless beams are each associated with respective beam identifiers, and wherein the determined orientation information comprises data representative of signal strength values for at least some of the respective millimeter-wave wireless beams identified by the respective identifiers.

18. The RFID transponder device of claim 17, wherein the controller is configured to:
generate a first table associating the signal strength values for the millimeter-wave wireless beams associated with one of the identifiers for the respective millimeter-wave wireless beams; and
produce a second, reduced, table based on the first table, the second table including signal strengths that are within a threshold signal level from a maximum signal strength identified in the first table;
wherein the determined orientation information comprises data representative of the reduced table.

19. The RFID transponder device of claim 17, wherein the controller is configured to use the determined orientation information to determine location information for the RFID transponder device by determining:
a distance between the remote device and the RFID transponder device based on a maximum signal strength from measured signal strength values for the respective millimeter-wave wireless beams; or
a direction from the remote device to the RFID transponder devices based on least-mean-squared interpolation applied to at least some of the measured signal strength values measured by the RFID transponder device for the respective millimeter-wave wireless beams.

20. The RFID transponder device of claim 15, wherein the receiver is configured to:
perform peak detection on the one or more second wireless signals while analog-to-digital conversion is disabled; and
respond to a peak of the one or more second wireless signals exceeding a first threshold by activating root-mean-squared detection and analog-to-digital conversion for a predetermined period of time.

21. The RFID transponder device of claim 20, wherein the receiver is configured to disable the root-mean-squared detection in response to a received signal strength of the one or more second wireless signals falling below a second threshold.

22. The RFID transponder device of claim 15, wherein the transceiver is configured to receive a RF frequency wireless signal with a frequency below 6 GHz.

23. The RFID transponder device of claim 22, wherein the RF frequency wireless signal comprises a UHF wireless signal.

24. The RFID transponder device of claim 22, further comprising a power harvester configured to generate electrical current or voltage inductively from at least the first wireless signal to power a mm-wave detection chain of the receiver.

25. The RFID transponder device of claim 24, wherein the power harvester is configured to power the controller and a low-frequency portion of the transceiver.

26. The RFID transponder device of claim 15, wherein the transceiver comprises a first antenna and the receiver comprises a second antenna, and wherein the second antenna is disposed within an area occupied by the first antenna.

27. A method comprising:
transmitting, from a reader device, a first set of wireless signals, in a first frequency band, detectable by RFID (radio frequency identification) transponder devices;
transmitting, from the reader device, a second set of wireless signals, at a second frequency band different from the first frequency band, detectable by the RFID transponder devices;
detecting, at the reader device, a set of reply wireless signals transmitted by one or more of the RFID transponder devices, in the first frequency band, in response to the first set of wireless signals, the set of reply wireless signals comprising identification data associated with the one or more of the RFID transponder devices, and orientation information representative of relative orientation of the respective one or more of the RFID transponder devices to the reader device, wherein the orientation information is based on the second set of wireless signals; and determining location information for at least one of the one or more of the RFID transponder devices based on the identification data and the orientation information.

28. The method of claim 27, wherein deriving the location information comprises deriving the location information for a particular RFID transponder device of the one or more of the RFID transponder devices by:

estimating a first line between a first mm-wave transmitter and the particular RFID transponder device based on signal strengths measured by the particular RFID transponder device from the first mm-wave transmitter;

estimating a second line between a second mm-wave transmitter and the particular RFID transponder device based on the signal strengths measured by the particular RFID transponder device from the second mm-wave transmitter;

determining whether the first line intersects the second line; and either:
in response to determining that the first line intersects the second line, determining a location of the particular RFID transponder device as an intersection point of the first line and the second line; or in response to determining that the first line does not intersect the second line, determining the location of the particular RFID transponder device as a location where a combined distance to the first line and the second line is smallest.

29. The method of claim 28, wherein estimating the first line and the second line comprises using least-mean-squared interpolation applied to the signal strengths measured by the particular RFID transponder device from the first mm-wave transmitter and from the second mm-wave transmitter, respectively.

30. A method comprising:
receiving, at an RFID (radio frequency identification) transponder device, a first wireless signal in a first frequency band transmitted by a remote device;

receiving, at the RFID transponder device from the remote device, one or more second wireless signals in a second frequency band different from the first frequency band;

determining orientation information, representative of a relative orientation of the RFID transponder device to the remote device based on the one or more second wireless signals; and transmitting, from the RFID transponder device, a reply wireless signal comprising at least identifier data associated with the RFID transponder device and the determined orientation information.

* * * * *